US 9,939,274 B2

(12) United States Patent
Nishimura et al.

(10) Patent No.: US 9,939,274 B2
(45) Date of Patent: Apr. 10, 2018

(54) PROVIDING ROUTE GUIDE USING BUILDING INFORMATION MODELING (BIM) DATA

(71) Applicants: INTERNATIONAL BUSINESS MACHINES CORPORATION; IBM JAPAN LTD., Tokyo (JP)

(72) Inventors: Yasutaka Nishimura, Yamato (JP); Masami Tada, Sagamihara (JP); Akihiko Takajo, Tokyo (JP); Takahito Tashiro, Higashi-kurume (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/765,028

(22) PCT Filed: Feb. 13, 2014

(86) PCT No.: PCT/JP2014/053281
§ 371 (c)(1),
(2) Date: Jul. 31, 2015

(87) PCT Pub. No.: WO2014/132802
PCT Pub. Date: Sep. 4, 2014

(65) Prior Publication Data
US 2015/0369612 A1 Dec. 24, 2015

(30) Foreign Application Priority Data
Feb. 27, 2013 (JP) .................. 2013-037634

(51) Int. Cl.
*G01C 21/20* (2006.01)
*G01C 21/34* (2006.01)
(52) U.S. Cl.
CPC ....... *G01C 21/206* (2013.01); *G01C 21/3484* (2013.01)

(58) Field of Classification Search
None
See application file for complete search history.

(56) References Cited

U.S. PATENT DOCUMENTS 8,417,446 B2 * 4/2013 Mays ................ G01C 21/20
382/153
8,825,387 B2 * 9/2014 Mays ................ G01C 21/20
701/433

(Continued)

FOREIGN PATENT DOCUMENTS

JP 11088935 3/1999
JP 2000097721 A 4/2000

(Continued)

OTHER PUBLICATIONS

International Search Report, International Application No. PCT/JP2014/053281, dated May 13, 2014, pp. 1-2.

(Continued)

*Primary Examiner* — Truc M Do
(74) *Attorney, Agent, or Firm* — David Zwick

(57) ABSTRACT

Providing a route guide to a destination using building information modeling (BIM) data. A request from a user for a route guide to a destination in a building is received. BIM data for the building, security information for a route, and a user profile of the user that requested the route guide to the destination is received. A route guide to the destination in the building is created, based at least on the BIM data, security information, and the user profile. Creating the route guide may be further based on use restriction information, including time, weight, operation, impassable information, information related to the method of using the facility equipment, or precaution information when using the facility equipment. The route guide may include a method of using the facility equipment in the building, a method of operating, a (Continued)

direction of operation, a method of unlocking or locking, or precaution information.

3 Claims, 28 Drawing Sheets

(56) References Cited

U.S. PATENT DOCUMENTS

| | | | | |
|---|---|---|---|---|
| 9,380,425 | B2* | 6/2016 | Meredith | H04W 4/023 |
| 9,460,479 | B1* | 10/2016 | Butler | G06Q 50/08 |
| 9,813,883 | B2* | 11/2017 | Michaelis | H04W 4/22 |
| 2003/0069694 | A1* | 4/2003 | Fuchs | G01S 5/0036 |
| | | | | 701/478 |
| 2007/0219711 | A1* | 9/2007 | Kaldewey | G01C 21/00 |
| | | | | 701/434 |
| 2009/0043504 | A1* | 2/2009 | Bandyopadhyay | G01C 17/38 |
| | | | | 701/469 |
| 2010/0023249 | A1* | 1/2010 | Mays | G01C 21/206 |
| | | | | 701/532 |
| 2010/0125409 | A1* | 5/2010 | Prehofer | G01C 21/3484 |
| | | | | 701/408 |
| 2010/0280836 | A1 | 11/2010 | Lu et al. | |
| 2011/0115816 | A1* | 5/2011 | Brackney | G06Q 10/06 |
| | | | | 345/629 |
| 2011/0184945 | A1* | 7/2011 | Das | G01C 21/206 |
| | | | | 707/724 |
| 2012/0016578 | A1* | 1/2012 | Coppens | G01C 21/32 |
| | | | | 701/433 |
| 2012/0086727 | A1* | 4/2012 | Korah | G06T 19/006 |
| | | | | 345/633 |
| 2012/0105202 | A1* | 5/2012 | Gits | G01C 21/206 |
| | | | | 340/8.1 |
| 2012/0169530 | A1* | 7/2012 | Padmanabhan | G01C 15/00 |
| | | | | 342/146 |
| 2012/0245839 | A1* | 9/2012 | Syed | G01C 21/165 |
| | | | | 701/408 |
| 2012/0313775 | A1* | 12/2012 | Davis | G01C 21/206 |
| | | | | 340/539.12 |
| 2013/0169681 | A1* | 7/2013 | Rasane | G06T 19/006 |
| | | | | 345/633 |
| 2013/0328929 | A1* | 12/2013 | Jeung | G06T 19/006 |
| | | | | 345/633 |
| 2014/0043436 | A1* | 2/2014 | Bell | H04N 13/0203 |
| | | | | 348/46 |

FOREIGN PATENT DOCUMENTS

| | | |
|---|---|---|
| JP | 2002286491 A | 10/2002 |
| JP | 2005003526 A | 1/2005 |
| JP | 2006017647 A | 1/2006 |
| JP | 2006133903 A | 5/2006 |
| JP | 2006250792 A | 9/2006 |
| JP | 2007093334 A | 4/2007 |
| JP | 2007128377 A | 5/2007 |
| JP | 2008033043 A | 2/2008 |
| JP | 2008298445 A | 12/2008 |
| JP | 2009229108 A | 10/2009 |
| JP | 2010286271 A | 12/2010 |
| JP | 2011021971 A | 2/2011 |
| JP | 2011075402 A | 4/2011 |
| JP | 2011145164 A | 7/2011 |
| JP | 2012128779 A | 7/2012 |
| WO | 2008117373 A1 | 10/2008 |
| WO | 2014132802 A1 | 9/2014 |

OTHER PUBLICATIONS

Autodesk, "BIM: Building Information Modeling," www.autodesk.com/solutions/building-information-modeling/overview, Printed on Mar. 27, 2015, pp. 1-2.

Application No. 2013-037634 (Japan), titled "Method of providing route guide using building information modeling (BIM) data, computer that provides route guide, and computer program thereof," filed on Feb. 27, 2013, pp. 1-71.

Google Inc., "Google Maps Floor Plan Marker," https://play.google.com/store/apps/details?id=com.google.android.apps.insight.surveyor&hl=en, Printed on Feb. 1, 2013, pp. 1-2.

Ghani, "Ubiquitous Computing in the Urban Landscape," Seminar Kebangsaan Rupa Bandar Malaysia: Mengekal Warisan Membina Identiti, Nov. 28-29, 2007, Lumut, Perak, pp. 332-338.

Ekipedia, "You never lose yourself! All metro station maps available," Ekipedia.jp, www.ekipedia.jp/show_station_map/1600,Printed on Mar. 26, 2015, pp. 1-2.

Graphisoft, "Accessing BIM Projects BIMx is now Easier than Ever," www.graphisoft.com/bimx/, Printed on Mar. 26, 2015, pp. 1-21.

ITMediaMobile, "KDDI and NAVITIME Japan, to participate in the demonstration of a barrier-free route guidance," Dyson Technology, Feb. 28, 2008, http://www.itmedia.co.jp/mobile/articles/0802/28/news038.html, pp. 1-4.

MapFanWeb, "Map Route Search, Map fan if you go out," http://www.mapfan.com/, Printed on Jul. 13, 2015, pp. 1-3.

IBM, "IBM Bluemix, US IBM Watson Institute invitation, to prepare a prize, such as Oculus Rift," IBM developerWorks, http://www.ibm.com/developerworks/jp/, Printed on Jul. 13, 2015, pp. 1-3.

Google, "Google Releases Indoor Map Improved Application—Dawn of the Launch of Indoor Map Service", Printed on Feb. 1, 2013, http://internet.watch.impress.co.jp/docs/news/20120409_525090.html, pp. 1-5.

MapFan, "iPhone Application: MapFan eye", Printed on Feb. 13, 2013, http://www.mapfan.com/iphone/ar/1, pp. 1-2.

IBM, "DB2 Security: Row Level Access Control Using 6th LBAC", Printed on Feb. 12, 2013, http://www.ibm.com/developerworks/jp/data/1library/dataserver/j-d_db2securityO6/, pp. 1-7.

IBM, "Summary of Row and Column Access Control (RCAC)", DB2 Version 10.1 for Linux, UNIX and Windows, Printed Feb. 13, 2013, http://pic.dhe.ibm.com/infocenter/db21uw/vl0rl/index.jsp?topic=%2Fcom.ibm.db2.luw.admin.sec.doc%2Fdoc%2Fc0057423.html, pp. 1-2.

* cited by examiner

301

14:00

| From activation | Current location if there is not input | Map |
| To activation | Toy store | Map |
| Route activation | Input facility name, room name, store name, or the like | Map |
| Date activation | MM DD YYYY | Calendar |
| Time | HH:MM | |

○ Departure time setting
○ Arrival time setting

Search options
● Prioritize escalators
○ Prioritize elevators
● Prioritize open routes
○ Cannot use any hands
○
○
○
○

Search options    Free text input

Search route guide

302

User profile

Do not use stairs

Using a stroller

From activation: [Current location if there is not input]
To activation: [Toy store]
Route activation: [Input facility name, room name, store name, or the like]
Date activation: [MM : DD : YYYY] [Calendar]
Time: [HH:MM]

○ Departure time setting
○ Arrival time setting

Search options
● Prioritize escalators
○ Prioritize elevators
● Prioritize open routes
● Cannot use any hands
○
○
○

Search options  Free text input

Search route guide

[Map] [Map] [Map]

332

User profile
Do not use stairs
Using a stroller

| From activation | Current location if there is not input | Map |
| To activation | Central tower north building 16th floor conference room | Map |
| Route activation | Input facility name, room name, store name, or the like | Map |
| Date activation | MM - DD - YYYY | Calendar |
| Time | 13:00 | |

○ Departure time setting
● Arrival time setting

Search options
○ Prioritize escalators
● Prioritize elevators
○ Prioritize open routes
● Shortest route
○ ○ ○ ○

Search options  Free text input

Search route guide

402

User profile
Employee of ..........
Employee ID
Development Dept.

From activation — Current location if there is not input
To activation — Central tower north building 16th floor conference room
Route activation — Input facility name, room name, store name, or the like
Date activation — MM : DD : YYYY
Time — 13:00

Map
Map
Map
Calendar

○ Departure time setting
○ Arrival time setting
Search options
○ Prioritize escalators
● Prioritize elevators
○ Prioritize open routes
○ Shortest route
○ ○ ○ ○

Search options    Free text input

Search route guide

432

User profile
Employee of _____
Employee ID
Sales Dept.

| Object | Attributes | Facility Manager | Company A Employees | Company B Employees | Company A Visitors (with In-advance Application) | Company A Visitors (no In-advance Application) | General Users |
|---|---|---|---|---|---|---|---|
| 1F General Gate | Name | O | O | O | O | O | O |
|  | Width, Height | O | O | O | O | O | O |
|  | ... | O | Some possible | Some possible | Some possible | Some possible | Some possible |
| 1F Employee Only Gate | Name | O | O | O | O |  |  |
|  | Width, Height | O | O | O | O |  |  |
|  | ... | O | Some possible | Some possible | Some possible |  |  |
| 3F Shared Passage A | Name | O | O | O | O |  |  |
|  | Width, Height | O | O | O | O |  |  |
|  | ... | O | Some possible | Some possible | Some possible |  |  |
| 3F Floor A (Company A) | Name | O | O |  | O |  |  |
|  | Width, Height | O | O |  | O |  |  |
|  | ... | O | Some possible |  | Some possible |  |  |
| 4F Floor A (Company B) | Name | O |  | O |  |  |  |
|  | Width, Height | O |  | O |  |  |  |
|  | ... | O |  | Some possible |  |  |  |

| Item | Value |
|---|---|
| Date | 2012/12/10 |
| Time | 17:15 |
| Climate | Rain |
| Wind Speed | North 2.5 m |

611

| Name | Manufacturer | Length | Height | Width | Direction of Movement | Operation Status | Notes |
|---|---|---|---|---|---|---|---|
| Outdoor Escalator 1 | X Company | 30 m | 8 m | 1.2 m | Down | Operating | 0:00 to 17:00 Up<br>17:00 to 19:00 Down<br>19:00 to 24:00 Up |
| Outdoor Escalator 2 | X Company | 30 m | 8 m | 1.2 m | Down | Operating | 0:00 to 8:00 Down<br>8:00 to 10:00 Up<br>10:00 to 24:00 Down |
| Indoor Escalator 1 | X Company | 15 m | 5 m | 1.2 m | Up | Operating | |
| Indoor Escalator 2 | X Company | 15 m | 5 m | 1.2 m | Down | Shutdown | Due to multiple slipping accidents, operation is shutdown when raining |

| Name | Manufacturer | Cost | Width | Height | Status | Security Check | Security Management Reception | Candidate Site |
|---|---|---|---|---|---|---|---|---|
| 1F Employee Only Gate | X Company | 500,000 | 300 | 250 | Normal | Y | 1F Security Center Reception | Y |
| 3F Conference 1 Door 1 | Y Company | 100,000 | 120 | 230 | Normal | Y | 2F Company A Reception | Y |
| 3F Passage A Automatic Door 1 | X Company | 80,000 | 90 | 200 | Out of Order | N | | Y |

621

PROVIDING ROUTE GUIDE USING BUILDING INFORMATION MODELING (BIM) DATA

BACKGROUND

The present invention relates to a route guide, and in particular relates to a route guide between buildings or inside buildings, and a method of providing route guidance to a destination through the inside of the building. In further detail, the present invention relates to a technique for providing a route guide using building information modeling (BIM) data.

A navigation system is a system that supports movement to a destination by presenting to a user a route to a destination along with a map, when a user inputs a destination and a starting point if necessary. Navigation systems were first developed as automotive navigation systems, and then as personal navigation devices (PND).

In recent years, in conjunction with enhanced functionality of mobile terminals such as smart phones, mobile phone, tablet terminals, mobile game devices, and the like, communication type navigation systems that transmit maps and route guide information from an information distribution server (possibly a route search server) to the mobile terminal have become popular as navigation systems for pedestrians. With these communication type navigation systems, application software installed in the mobile terminal (hereinafter also simply referred to as "application") provides navigation functions to the user of the mobile terminal in cooperation with an application related to navigation that is installed in the information distribution server.

For example, Google® Maps, Ekipedia, NAVITIME®, MapFan® eye, Docomo® DriveNet, and Its-mo Navi are known applications that provides navigation functions to the mobile terminal.

Google Maps provides an indoor map function (known as "Indoor Google Maps" in addition to maps, local (regional) search functions, and route and transfer guidance functions. Indoor Google Maps enables viewing of indoor maps of some commercial facilities such as airports, train stations, department stores, shopping centers, malls, and the like using Google Maps. Furthermore, Google is publishing "Google Maps Floor Plant Marker" application on the Internet. With "Google Maps Floor Plan Marker", the application collects GPS, mobile base station, and Wi-Fi data and the like while the user walks around inside the building, and can enhance navigation precision based on this collected data.

Ekipedia provides barrier free transfer maps in addition to train route searching functions.

Navitime® provides a TOTALNAVI® function that searches and displays the optimal route from a starting point to a destination, as well as a GURUTTONAVI® function that also searches for an optimal route by setting a midpoint in addition to a destination and starting point. Navitime Japan which is the developer of Navitime uses Navitime and is participating in verification testing of barrier free route guidance (Refer to nonpatent literature 4).

MapFan® eye is an AR pedestrians route guide application where the direction of travel can be intuitively understood simply by pointing an iPhone® in the forward direction.

Japanese Unexamined Patent Application 2011-21971 discloses an indoor guidance system that includes a plurality of marker devices provided at predetermined positions in a building, and a portable user terminal that can wirelessly transfer data with the marker devices. (Paragraph 0009).

Japanese Unexamined Patent Application 2006-250792 discloses a route information control system in which route information is transferred and recorded between a plurality of position marking devices that are attached along the route and a terminal device carried by a pedestrian (claim 1).

In order to achieve appropriate route guidance even in an indoor environment (paragraph 0012), Japanese Unexamined Patent Application 2010-286271 discloses a route guiding device that stores information that identifies a plurality of rooms and map information that includes information that identifies the contact point that a person travels through between each room and the rooms adjacent to each room, ranking is applied to each combination of the plurality of rooms and the plurality of contact points, and information that identifies one or more guidance information distribution points that define the direction is stored, and at least one guidance photograph data is stored for each of the one or more guidance information distribution points (claim 1).

Japanese Unexamined Patent Application 2011-75402 discloses that a storage part of a navigation server provides facility information recording means that associates and records coordinates for each facility, a building ID for each building where the facility exists, and a floor ID of the floor of the building where the facility exists (claim 1).

Japanese Unexamined Patent Application 2011-145164 discloses a navigation device having a recording part that stores outdoor map data indicating the condition of outdoor space, facility data that includes facilities provided at the starting point and the destination, structured data that expresses the indoor space of the structure, network data that includes link information between a node and another node required for route searching, structure and facility corresponding data that includes the relationship between structures and the facility, and data corresponding to structures and notes that include the corresponding relationship between notes and structures (claim 1).

Japanese Unexamined Patent Application 2000-97721 discloses an indoor movement control device for a traveler that detects position using an indoor PHS and antenna technology, displays a travel route from a current position to a destination of the traveler on a terminal carried by the traveler, and announces route information while controlling entry by introducing and distinguishing security distinguishing events based on the security level of the destination (paragraph 0001).

Japanese Unexamined Patent Application 2006-133903 discloses an integrated information service system that provides integrated information support indoors and outdoors (paragraph 0004).

Japanese Unexamined Patent Application 2006-017647 discloses a communication navigation system that can effectively search for routes across floors even in underground malls and inside buildings (paragraph 0025).

Japanese Unexamined Patent Application 2008-33043 discloses a map information distribution system that efficiently distributes indoor route guiding maps even to terminal devices with a small display screen and a relatively small transfer capacity such as a mobile phone or PDA or the like (paragraph 0013).

Japanese Unexamined Patent Application 2012-128779 discloses a virtual object display device that generates a virtual object in three-dimensional virtual space, and displays the virtual object to a viewer (paragraph 0001).

SUMMARY OF THE INVENTION

In recent years, multiuse facilities where a plurality of corporations, commercial facilities, and public facilities (such as train stations and airports) reside in one building have been increasing, as represented by EKINAKA and EKICHIKA. These multiuse facilities have a plurality of entrances and exits, of which some may be entrances and exits dedicated to residents or employees. Furthermore, these multiuse facilities may be connected with other buildings through underground passageways, ground-level passageways, and overhead passageways. Furthermore, these multiuse facilities may have areas of restricted access (for example areas with a security gate or security zone), and, for example, may have areas where travel is prohibited due to construction or maintenance, or areas that are not barrier free. Furthermore, there are cases where the operating direction of equipment (for example an escalator) may change to the opposite direction, for example, depending on the time of day (for example during commuting rush-hour), or cases where equipment (such as an elevator) changes the floors that stopping is permitted depending on the time of day (for example times with large numbers of visitors). Therefore, users of these multiuse facilities may become confused or must make unavoidable detours. Therefore, many users have trouble smoothly reaching their destination.

Furthermore, in these multiuse facilities, emergency exit routes and barrier free routes are often unclear.

Indoor route searches and barrier free route searches are possible due to the widespread use of communication-based navigation systems. However, during indoor route searches and barrier free route searches using conventional communication type navigation systems, only a floor map may be displayed. Therefore, the user must determine the route to the destination from the displayed floor map. Furthermore, the user may not be able to determine from the displayed floor map whether there are areas with restricted travel, whether there are areas where travel is prohibited, whether the area is barrier free, and changes in the direction of operation or permitted stopping floors of equipment based on the time of day.

When using indoor map improved applications such as "Google Maps Floor Plan Marker", the service provider must survey by walking through the building as instructed on the application screen in order to evaluate the indoor route. Furthermore, the service provider must similarly survey by actually walking through the building when surveying the barrier free status in the building or when surveying changes in the operation of equipment due to the time of day.

Furthermore, when surveying the security status of the facility equipment, the service provider must survey by contacting the management of the facility equipment. However, the security status is often private, so the service provider cannot easily acquire information about the security status.

Furthermore, surveying the security status is normally difficult in personal residences and buildings with security personnel where permission is required in order to enter the facility equipment.

Therefore, an object of the present invention is to provide a route guide (for example navigation) suitable for the individual situation of each user by comprehensively considering the facility equipment in the building, the function and status thereof, the affiliation or authority of the user, and the area to be visited and the objective of the visit. The route guide of the present invention can be a route guide inside a building or between buildings, or a route guide to a destination through the inside of the building.

Furthermore, an object of the present invention is to be able to provide a route guide that eliminates or reduces the need for various surveys.

Furthermore, an object of the present invention is to automatically reflect in real time changes in the route guide, when there are changes to the facility equipment in the building or to the function or status thereof.

The present invention provides a technique for providing a route guide using building information modeling (BIM) data. This technique can include a method for providing a route guide using BIM data, a computer that provides the route guide, a terminal device that is connected through a network to the computer, a computer program and a computer program product that provide the route guide, and a route guide system that includes the computer and the terminal device.

The method according to the present invention includes
a step of preparing BIM data, security information on a route, and a user profile of a user that uses the route guide; and
a step of creating a route guide to the destination depending on a destination in the building set by the user, based on the BIM data, security information, and the user profile.

In one aspect of the present invention, the method further includes a step of displaying the route guide that was created.

Furthermore, the computer according to the present invention includes recording means that stores BIM data, security information on a route, and a user profile of a user that uses the route guide; and
guide creating means for creating a route guide to the destination depending on a destination in the building set by the user, based on the BIM data, security information, and the user profile.

Furthermore, the terminal device according to the present invention includes displaying means for displaying a route guide created by the computer.

In one aspect of the present invention, the presenting means can use augmented reality (AR) technology to overlay and display information related to the method of using the equipment to the building, the method of operating, the direction of operation, and the method of unlocking or locking, as well as precaution information, over a still image or moving image in the route guide that is displayed.

In one aspect of the present invention, the terminal device also includes destination setting means that enables the user to set a destination in a building.

In one aspect of the present invention, the terminal device also includes user profile setting means that enables the user to set a user profile.

In one aspect of the present invention, the terminal device also includes search option setting means that enables the user to set search options.

Furthermore, the route guide system according to the present invention includes the terminal device according to the present invention and the computer according to the present invention that is connected through a network to the terminal device.

Furthermore, the computer program and computer program product according to the present invention cause the computer to execute each of the steps of the method according to the present invention.

Furthermore, the terminal device program and terminal device program product according to the present invention cause the terminal device to execute each of the steps of the method according to the present invention.

The computer program and/or program for the terminal device according to an aspect of the present invention can store data on one or a plurality of a flexible disk, MO, CD-ROM, DVD, BD, hard disk device, USB connectable memory media, ROM, MRAM, RAM, and any other computer readable recording media. The computer program and program for the terminal device can download from another data processing system such as a server or computer that is connected to a communication circuit, or can copy from other recording media. Furthermore, the computer program and/or program for the terminal device according to an aspect of the present invention can also compress or split into a plurality of parts and store on one or a plurality of recording media. Furthermore, it should be noted that the computer program product and/or terminal device program product according to an aspect of the present invention can naturally be provided in a variety of forms. The computer program product and/or terminal device program product according to an aspect of the present invention can include transfer media that transfers the computer program, or recording media that records the computer program, for example.

Various changes to the hardware components of the computer that is used in an aspect of the present invention can be easily conceived by one skilled in the art, such as combining a plurality of machines and distributing the various functions. These changes are concepts that are included in the idea of the present invention. However, these components are examples, and not all of the components may be essential components of the present invention.

Furthermore, the present invention may be implemented by hardware, software, or a combination of hardware and software. When implemented by a combination of hardware and software, execution may be in a computer where the aforementioned computer program executes. In this case, the computer program is loaded and executed in the memory of the computer, and therefore the computer program controls the computer and causes execution of the processes related to the present invention. The computer program can be composed of a group of commands that can be expressed by any language, code, or description. This group of commands enables the computer to execute specific functions, either directly, or after converting to another language, code, or description, or copying to other media.

In accordance with an aspect of the present invention, the user is able to take advantage of route guide services that comprehensively consider the facility equipment in a building, the function and condition, the authority and attributes of the user, the person to be visited and the reason for the visit.

Furthermore, in accordance with an aspect of the present invention, the user is able to take advantage of route guide services that consider in real time the facility equipment in a building at the time of a visit to the building or when searching the route guide, the function and condition, the authority and attributes of the user, the person to be visited and the reason for the visit.

BRIEF DESCRIPTION OF THE DRAWINGS

FIG. 3A illustrates a screen for the user to input or set the information necessary for requesting a route guide on the terminal device in accordance with an aspect of the present invention.

FIG. 3C illustrates a screen for the user to input or set in a terminal device the information necessary for requesting a route guide to the same destination as in FIG. 3A but at a different time, in accordance with an aspect of the present invention.

FIG. 4A illustrates a screen for a first user to set the information necessary for requesting a route guide on the terminal device in accordance with an aspect of the present invention.

FIG. 4C illustrates a screen for a second user with a different user profile than in FIG. 4A to set the information necessary for requesting a route guide on the terminal device in accordance with an aspect of the present invention.

FIG. 5A illustrates an example of access restriction information to BIM data and security information, that can be used in an aspect of the present invention.

FIG. 6A illustrates an example of BIM data and external information that can be used for determining an impassable route, in accordance with an aspect of the present invention.

FIG. 6B illustrates an example of security information on a route and the BIM data that can be used to determine a midway point and a midway point order, in accordance with an aspect of the present invention.

DETAILED DESCRIPTION

An embodiment of the present invention is described below in conjunction with the drawings. In the following figures, the same symbols are used to indicate the same elements unless otherwise specified. These embodiments describe a preferred embodiment of the present invention, but it should be understood that there is no intent to restrict the scope of the invention to the embodiments described herein.

Figure 1:
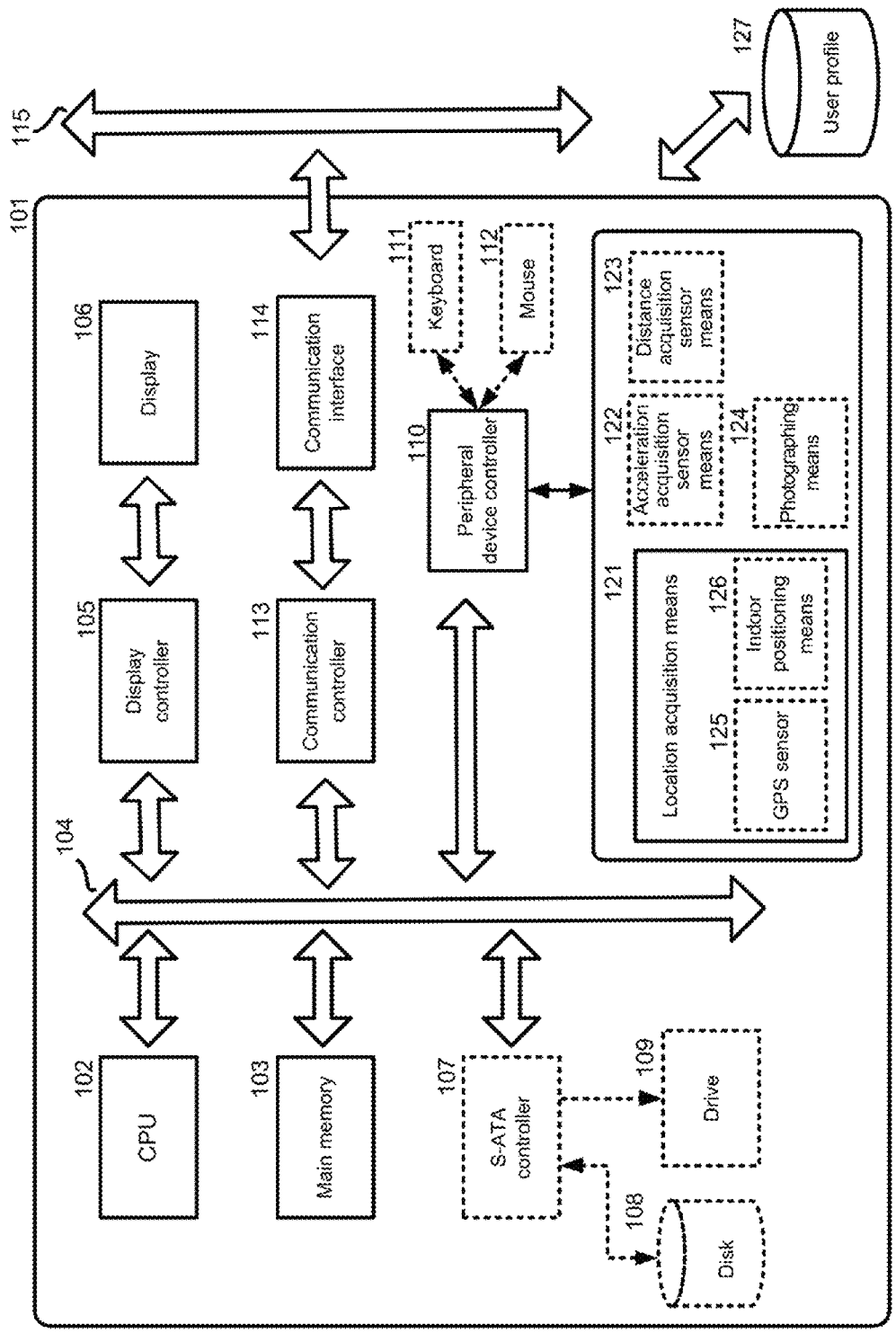
FIG. 1 is a diagram illustrating an example of a hardware configuration for implementing the terminal device (client) that can be used in an aspect of the present invention.
Figure 2:
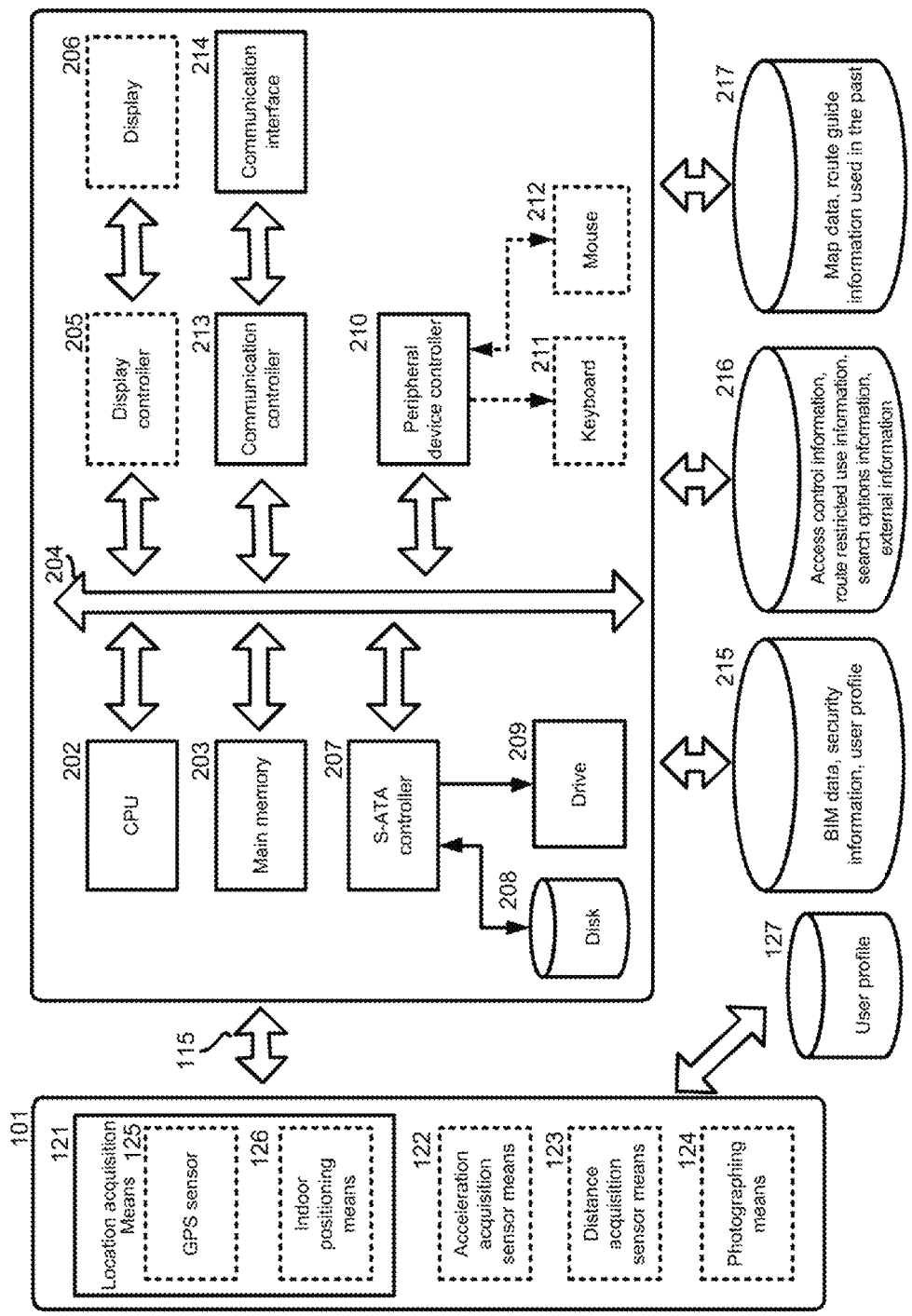
FIG. 2 is a diagram illustrating an example of a hardware configuration for implementing the computer (server) that can be used in an aspect of the present invention.

The route guide system according to an embodiment of the present invention provides a terminal device, and a computer that is connected to the terminal device through a network. FIG. 1 illustrates an example of a hardware configuration for implementing the terminal device, and FIG. 2 illustrates an example of a hardware configuration for implementing the computer.

FIG. 1 is a diagram illustrating an example of a hardware configuration for implementing the terminal device (101) that can be used in an aspect of the present invention. The terminal device (101) is a terminal device for a route guide system according to an embodiment of the present invention, and may also be referred to as a client.

The terminal device (101) can be any type of device that can display a route guide to the user. The terminal device (101) can be, for example, a smart phone, mobile phone, tablet terminal, such as an Android terminal, When Does® tablet, or iOS terminal, a personal digital assistant (PDA), game terminal, workable navigation system, head mount display, digital camera, kiosk terminal, computer, for example, a notebook computer.

The terminal device (101) includes a CPU (102) and a main memory (103), which are connected by a bus (104). The CPU (102) preferably is based on a 32-bit or 64-bit architecture. The CPU (102) can be, for example, a CPU for a smart phone, mobile phone, or tablet terminal, A Series produced by Apple Corporation, Core i™, Core 2™ Series, Atom™ Series, Xeon™ Series, Pentium® Series, or Celeron® Series produced by Intel Corporation, A Series, Phenom™ Series, Athlon™ Series, Turion™ Series, or Sempron™ produced by AMD (Advanced Micro Devices), or Power® Series of International Business Machines Corporation.

The bus (104) is connected to a display (106), such as a liquid crystal display (LCD) through a display controller (105).

The liquid crystal display (LCD) can be a touch panel display or a floating touch display. The display (106) is used for displaying information that is displayed by operating software operating on the terminal device (101) such as the program for the terminal device according to the present invention, for example, and the route guide that can be displayed in accordance with an aspect of the present invention (either two-dimensional or three-dimensional still image or moving image), using an appropriate graphic interface.

The bus (104) can optionally be connected to a disk (108) such as a hard disk or a solid state drive, through a SATA or IDE controller (107).

The bus (104) can optionally be connected to a disk (108), or drive (109) such as a CD, DVD, or BD drive, through a SATA or IDE controller (107).

The bus (104) can be optionally connected to a keyboard (111) and a mouse (112) through a peripheral device controller (110) such as a keyboard and mouse controller or through a USB bus.

The bus (104) can connect to position detecting means (121) and optionally to acceleration detecting sensor means (122), distance detecting sensor means (123), and/or imaging means (124). The position detecting means (121), acceleration detecting sensor means (122), distance detecting sensor means (123) and/or photographing means (124) can be incorporated into the terminal device (101), or can be connected by a cable or through a wireless network.

The position detecting means (121) can be a measuring sensor that measures the current position of the terminal device (101). The position detecting means (121) preferably includes both means that can measure the current position of the terminal device (101) outdoors, and indoor position measuring means (126) that can measure the current position of the terminal device (101) indoors.

The means that can measure the current position of the terminal device (101) outdoors can be, for example, a GPS sensor (125) that can measure the latitude, longitude, and altitude of the terminal device (101) by receiving a global positioning system (GPS) signal.

The indoor position measuring means (126) can be, for example, a position measuring means using a wireless LAN signal, or position measuring means using Bluetooth®. The position measuring means that uses a wireless LAN signal can be, for example, PlaceEngine® (not shown in the drawings) that measures the position of the terminal device (101) based on the radiowave intensity of a wireless signal received from a wireless LAN access point. Furthermore, the indoor position measuring means (126) can be, for example, position measuring means (not shown in the drawings) that uses an ultra wideband (UWB). Furthermore, the indoor position measuring means (126) can be, for example, hybrid position measuring means that combines a GPS sensor (125) and PlaceEngine (not shown in the drawings).

The acceleration detecting sensor means (122) is a sensor for detecting acceleration, and can be a sensor that can measure triaxial acceleration of the user holding the terminal device (101). The acceleration detecting sensor means (122) can also determine whether the user that is holding the terminal device (101) is stationary or moving.

The distance detecting sensor means (123) can be an infrared beam type, laser type, or ultrasonic type distance sensor that can measure the distance between an object in actual space (such as a moving object) and the terminal device (101) (or the position of the user). The distance detecting sensor means (123) can be provided so as to face in an arbitrary direction, but, for example, can be provided such that the optical axis of the photographing means (124) faces a different direction. With the infrared beam method, a three-dimensional distance measuring infrared beam camera can be used. The three-dimensional distance measuring infrared beam camera is a three-dimensional distance camera that uses a TOF (time of flight) method distance image sensor to calculate the distance based on the light travel time, and can measure the distance to a subject within line of sight. The laser method can use a laser distance meter, for example. The laser distance meter can measure distances from several centimeters to tens of meters and even up to approximately 200 m, using the reflection of laser light. The ultrasonic method can measure the distance between a measurement subject and the terminal device (101) by using approximately 40 kHz ultrasonic waves, and measuring the time from transmission of the ultrasonic waves until the waves are bounced back by the measurement subject (object subject to measurement).

The terminal device (101) can also include a gyro sensor and/or a geomagnetic sensor, for example.

The gyro sensor (not shown in the drawings) can be a sensor that can measure the angle of the terminal device (101).

The geomagnetic sensor (not shown in the drawings) can be a sensor that can measure the direction of the terminal device (101).

The photographing means (124) can be any type of device that has a function that can record video. The imaging means can be, for example, a camera module that has an imaging element such as a charge coupled device (CCD), image sensor or a complementary metal oxide semiconductor (CMOS) image sensor. The photographing means (124) can be used for generating a series of input images by taking images of the actual space. The series of input images can be used for more accurately measuring the current position of the user, in addition to measurement of the current position using GPS.

The disk (108) can store an operating system (such as a smart phone OS, for example, Android OS, Windows® Phone OS, or Windows® OS, or iOS), Windows OS, UNIX®, Mac OS, as well as programs that provide a Java® processing environment such as J2EE, Java applications, Java virtual machine (VM), and Java just-in-time (JIT) compiler, application programs for position detecting functions, application programs for acceleration and distance detecting sensors, application programs for imaging functions, application programs that enable packaging of the present invention, and other programs and data (such as route guide data).

The disk (108) can be integrated into the terminal device (101), or can be connected by a cable that allows access by the terminal device (101), or the terminal device (101) can be connected through a wire or wireless network that enables access.

The drive (109) can be used for installing onto the disk (108) a program such as an operating system or application from CD-ROM, DVD-ROM, or BD.

The communication interface (114) conforms to Ethernet® protocol, for example. The communication interface (114) is connected to the bus (104) through a communication controller (113), acts to wire or wirelessly connect the terminal device (101) to a communication circuit (115), and provides a network interface layer for the TCP/IP communication protocol for the communication function of the operating system of the terminal device (101). Note that the communication circuit can be a mobile phone network environment (for example 3G or 4G environment) or a wireless LAN environment based on a wireless LAN connection standard, or a Wi-Fi wireless LAN environment such as IEEE802.11a/b/g/n, and the like.

The terminal device (101) can store a user profile (127) onto the disk (108) or a recording medium that can be accessed by the terminal device (101).

The user profile (127) can be information related to the user of the terminal device in particular. The user profile (127) can be directly input to the terminal device (101) by the user, for example. The user profile (127) includes, for example, the attributes of the user or the condition of the user.

The attributes of the user can include, for example, the gender, age, or age range of the user, preferences (such as whether to prioritize either elevators or escalators), whether or not the user is pregnant or is using a baby stroller, whether or not the user is using a wheelchair or crutches, and information related to the purpose of the user's visit. Furthermore, the attributes of the user can include title or position in a company, or the security level. The title or position in the company can be, for example, a general visitor, employee, essential person (VIP), security personnel, cargo delivery company, or a person with approval to enter. The security level can be, for example, permission to pass through a security gate, permission to enter a room, or permission to leave a room. Information related to the purpose of the user's visit can be, for example, temporary user information, such as the visiting company, visiting department, or visiting section, or a scheduled visitor.

The condition of the user can be, for example, both hands are full, shoes are slippery, traveling with a baby or infant, or the number of companions.

FIG. 2 is a diagram illustrating an example of a hardware configuration for implementing the computer (201) that can be used in an aspect of the present invention. The computer (201) can connect with the terminal device (101) illustrated in FIG. 1 through the communication circuit (115). The computer (201) is a computer in the route guide system according to an aspect of the present invention, and can also be a server.

The computer (201) can be any type of device that can create and provide to the terminal device (101) the route guide for displaying to the user. The computer (201) can be one or a plurality of computers that are configured as a server, for example.

The computer (201) includes one or a plurality of CPU (202) and a main memory (203), and these are connected by a bus (204). The CPU (202) is preferably based on a 32-bit or 64-bit architecture, and examples include the International Business Machines Corporation® Power® Series, Intel Corporation® Core i™, Core 2™ Series, Atom™ Series, Xeon™ Series, Pentium® Series, or Celeron® Series produced by Intel Corporation, A Series, Apple® A series, or Phenom™ Series, Athlon™ Series, Turion™ Series, or Sempron™ produced by AMD.

The bus (204) is optionally connected to a display (206), such as a liquid crystal display (LCD) or a touch or multi-touch liquid crystal display, through a display controller (205). The display (206) is used for displaying information that is displayed by operating software operating on the computer (201) such as the program for the computer according to an aspect of the present invention, for example, using an appropriate graphic interface.

The bus (204) can also be connected to a disk (208) such as a hard disk or a silicon disk, and to a drive (209) such as a CD, DVD, or BD drive, through a SATA or IDE controller (207). The bus (204) can be also connected to a keyboard (211) and a mouse (212) through a peripheral device controller (210) or a USB bus (not shown in the drawings).

The disk (208) can store an operating system such as Windows® OS, UNIX®, or Mac OS®, as well as programs that provide a Java® processing environment such as J2EE, Java® applications, Java® virtual machine (VM), and Java® just-in-time (JIT) compiler, and other programs and data.

The disk (208) can be integrated in the computer (201), or can be connected by a cable that allows access by the computer (201), or the computer (201) can be connected through a wire or wireless network that enables access.

The drive (209) can be used for installing onto the disk (208) a program such as an operating system or application from CD-ROM, DVD-ROM, or BD.

The communication interface (214) conforms to Ethernet® protocol, for example. The communication interface (114) is connected to the bus (204) through a communication controller (213), acts to physically connect the terminal device (101) to a communication circuit (115), and provides a network interface layer for the TCP/IP communication protocol for the communication function of the operating system of the terminal device (101). Note that the communication circuit can be a mobile phone network environment (for example 3G or 4G environment) or a wireless LAN environment based on a wireless LAN connection standard, or a Wi-Fi wireless LAN environment such as IEEE802.11a/b/g/n, and the like.

The computer (201) can store BIM data, security information, use restriction information, and the user profile (127) onto the disc (208) or a recording medium that can be accessed by the computer (201) (refer to recording means 215, 216, and 217). The recording means (215, 216, and 217 can be the same or different. If there are a plurality of recording means, the manufacturer can appropriately set which data is stored in which recording means.

The BIM that is used in an aspect of the present invention is described below.

Figure 14:
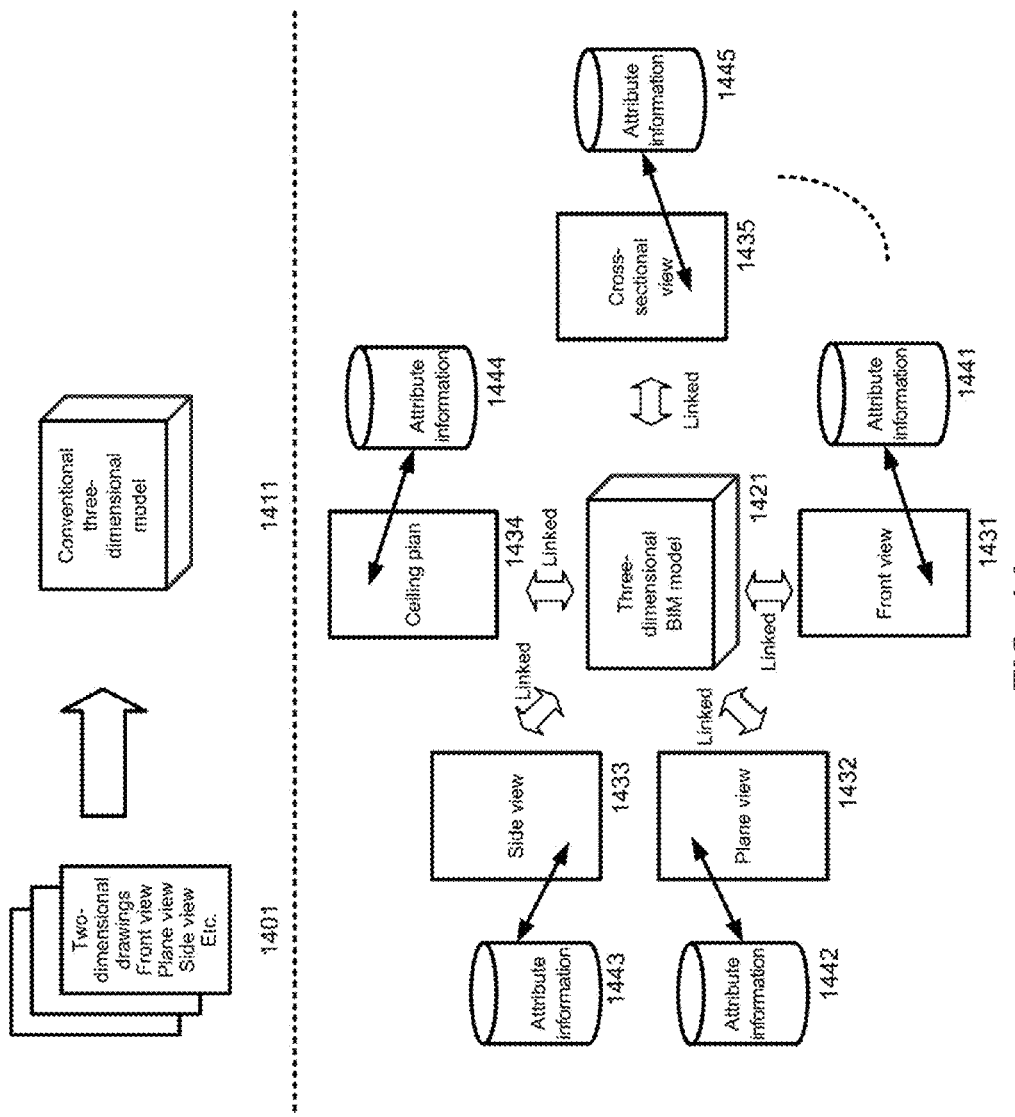
FIG. 14 is a diagram illustrating the difference between a three-dimensional model and a BIM three-dimensional model.

FIG. 14 is a diagram illustrating the difference between a conventional three-dimensional model (1411) and a BIM three-dimensional model (1421).

The BIM three-dimensional model (1412) differs on the following points from a conventional three-dimensional model (1411) that is created when creating a CG path (computer graphic perspective) or the like. The conventional three-dimensional model (1402) is a data expression of a two-dimensional drawing (production drawings) (1401) as a model, but the BIM three-dimensional model data is a data expression of a building as a model. Furthermore, the BIM three-dimensional model is not simply a model for expressing design, but rather includes structure design and equipment design time signals, as well as attribute information (properties) for each member that is used in the building. In other words, with the BIM three-dimensional model, the attribute information is also included and managed as a single piece of data.

With the BIM three-dimensional model (1412) of FIG. 14, the BIM three-dimensional model and the two-dimensional drawings (1431, 1432, 1433, 1434, and 1435) are linked, and the BIM three-dimensional model attribute information (1441, 1442, 1443, 1444, and 1445) are also shown as being linked to the two-dimensional drawings. For example, the attribute information (1442) is attribute information of the floor that is in the BIM three-dimensional model (for example name, model, ease of slipping, manufacturing date, manufacturer, and cleaning schedule). For example, the attribute information (1442 is attribute information of an elevator in the BIM three-dimensional model (for example, name, model, stopping floors, usage such as for lower floors or higher floors, for general use, for cargo, or for people and goods, operating time, manufacturing date, manufacturer, and maintenance schedule). For example, the attribute information (1443) is attribute information for an escalator in the BIM three-dimensional model (for example, name, model, operating direction by time of day, operating time, manufacturing date, and manufacturer). For example, the attribute information (1444) is attribute information for a room in the BIM three-dimensional model (for example, affiliation, size, ceiling height, presence of security, person capacity, and air conditioning information).

The BIM three-dimensional model has the aforementioned characteristics, and therefore the BIM can be defined as shown below. The BIM is a solution for utilizing information from a database of the building that includes the aforementioned attribute information in addition to the digital three-dimensional model of the building that was created using computer aided design (CAD) software, in various processes ranging from construction design and implementation to maintenance management. Therefore, in a BIM three-dimensional model, a three-dimensional model is generated by computer before construction on the actual building, and this model can be used to manage the cost and the various specifications such as design, structure, equipment, and the like, and to establish a cost-efficient construction plan that considers environment performance, engineering simulation, and ecology.

In one aspect of the present invention, commercial software can be optionally used as the software that packages the BIM. Examples of commercial BIM software include: Autodesk® Revit Architecture; Graphisoft ArchiCAD®; Bentley Systems® Architecture; and Fukui Computer GLOOVE. For example, Autodesk's® Revit Architecture can be used to automatically create plan views, elevation views, cross-section views, bill of quantities, door and window schedules, and the like.

In an aspect of the present invention, attribute information in the BIM can include, for example, attribute information indicating the shape, material, operation, and function of elements that compose the building. Furthermore, the attribute information in the BIM can include attribute information that expresses spatial relationships, geographic information, quantities, and manufacturer information. The elements that compose the building can be members that can pose the building, combinations thereof, or facility equipment in the building.

The attribute information that expresses the shape of the elements that compose the building can include the width, depth, and height of members that compose the building or combinations thereof, as well as connection information to other objects (such as equipment in the building, components that compose the building, and combinations thereof). Furthermore, the attribute information that expresses the shapes that compose the building can include the width, depth, and height of equipment in the building, as well as connection information to other objects (such as other equipment in the building, components that compose the building, and combinations thereof).

The attribute information that expresses the material properties of the elements that compose the building can be information related to the material characteristics of the components that compose the building (such as ease of slipping), color, and gloss.) Furthermore, the attribute information that expresses material properties can be information related to the material properties of the equipment the building (such as ease of slipping, flame retardancy, durability), color, and gloss.

The attribute information that expresses the operation of the elements that compose the building can be information related to the operation of the components that compose the building as well as the operation of combinations thereof. Furthermore, the attribute information that expresses operations can be information related to the operation of the equipment in the building. The information related to operations can include information such as the direction of opening and closing doors and windows, automatic or manual operation of doors and windows, the rotating direction of rotating doors and the like, the operating direction of escalators and the like, stopping information and the stopping floors for elevators and the like, as well as information that is updated depending on the time of day.

The attribute information that expresses the function of the elements that compose the building can be information related to the function of the building, information related to the function of components that compose the building as well as the function of combinations thereof, and information related to the function of equipment in the building. Information related to function can be, for example, information related to air conditioning function, the size of each room, the length and width of passageways, ceiling height, space information, earthquake resistant, flame retardancy base values, information related to locking functions, and the occupancy capacity of the building, each floor, and each room.

Furthermore, the attribute information in the BIM can further include, for example, maintenance management information, such as maintenance management information for the facility equipment in the building and for elements that compose the building, in addition to the aforementioned attribute information that expresses the shape, material properties, operation, and function of the elements that compose the building. Maintenance management information can include residents information (such as name of residents, number of residents, purpose and application of occupancy), tenant information (such as tenant name, number of residents, tenant purpose and application), maintenance status of building and equipment (including conditions such as passable or impassable), use of equipment (such as general use, cargo use, customer use, or employee use), event information in the building, traffic restriction information, remodeling or improving information, history of processes, instructions, and maintenance (such as initial installation date, replacement date, replacement timing, scheduled replacement timing, and maintenance schedule), as well as manufacturers information for the elements that compose the building, the quantities used, cost information, asset ledger information, classification code information, and inventory information for maintenance.

Furthermore, the maintenance management information can be an operating method or position information of the building, equipment in the building, and elements that compose the building.

In one aspect of the present invention, the computer (201) has security information for the route and the user profile, in addition to the BIM data (215).

The security information for the route can be information of establishing a security zone in each floor or in each room, and the presence of a security gate.

The user profile can be the same as the user profile (127) illustrated in FIG. 1.

Furthermore, in one aspect of the present invention, the computer (201) optionally includes the aforementioned BIM data and/or access restriction information for security information, (hereinafter also referred to as "access restriction information"), use restriction information on the route, search option information, and/or external information (216).

The access restriction information can be, for example, user information of accessibility to the aforementioned BIM data and/or security information (for example user ID or user attributes).

The use restriction information for the route can be, for example, information on restrictions based on time, weight, or operation, impassable information (for example under construction), information on restrictions related to the method of using facility equipment in the building, and precaution information when using the facility equipment. Furthermore, the used restriction information for the route can be, for example, a requirement to register users at a receptionist, or a requirement to first contact a receptionist. The use restriction information for the route can be, for example, information that the route is slippery when wet, that the doors are locked after 7 p.m., that the route is congested between 5:30 and 6:00 p.m., or that the weight restriction is 300 kg.

Search option information is option information that is input to the terminal device (101) by the user, and is information that is temporarily stored in the computer (201). The search option information is, for example, escalator priority, elevator priority, lower congestion route priority, use of a wheelchair, use of crutches, travel outside of the building, time to reach a midway point (for example a restroom or an information counter) or the destination, and departure time or arrival time.

The external information is information obtainable, for example, from a terminal device (101) or another computer (not shown in the drawings) other than the computer (201), and can be information that is temporarily stored in the computer (201). The external information can be information that is not stored in the BIM data, but that can be received from the outside. The external information is, for example, weather information, event information, congestion information, or real-time information. Weather information can be, for example, the weather, temperature, and/or wind direction. Event information can be the opening time for an event held in the building, and/or the event location. Congestion information can be, for example, the number of people in a specific space, or the ratio of space occupied by people. Real-time information can be, for example, at least one or more piece of information that includes the current position of the user (terminal device), resident or tenant information, equipment maintenance status, event information, travel restriction information, remodeling or improving information, current time, or the maintenance management information.

Furthermore, in one aspect of the present invention, the computer (201) can contain map data and optionally route guide information that has been used by a user in the past.

The map data can be any map data that is used in conventional navigation systems. The map data can include, for example, road network data, map drawing data, data of buildings next to roads, and building drawing data. Furthermore, the map data can include map data for inside buildings. The map data can be either two-dimensional or three-dimensional data. Furthermore, the map data can include both two-dimensional data and three-dimensional data.

Route guide information that has been used by the user in the past can be route guide information transmitted to the mobile terminal (101) in accordance with the present invention, route guide information corresponding to route guides that were previously selected by the user from a plurality of route guides displayed on the mobile terminal (101), route guide information with a high selection rate from a plurality of route guide information, and route guide information with high user evaluations from a plurality of route guide information.

Two embodiments illustrated in FIG. 3A through FIG. 3B and FIG. 3C through FIG. 3D are examples where different routes are provided to the same user depending on the time of day and the condition of the user, in accordance with an aspect of the present invention.

FIG. 3A illustrates a screen where a user inputs or sets information for requesting a route guide on a terminal device (101), in accordance with an aspect of the present invention.

The user is accompanied by a child in a baby stroller on the third floor of a commercial building of a train station. The user wishes to travel to a toy store on the second floor of the same building. The user launches an application for route guidance on the terminal device (101) at 14:00.

The route guide application begins authentication of the user if necessary. The user inputs into the terminal device (101) a user ID and optional password required for receiving the route guide service. Alternatively, the user performs biometric certification on the terminal device (101).

The terminal device (101) receives the user input based on successful authentication of the user. The user selects or inputs to the user input screen (301) the starting point (facility name, room name, store name, or the like can be input, but if a starting point is not input, the current position of the terminal device (101) will be taken as the starting point), destination (facility name, room name, or store name or the like can be input) midway point (facility name, room name, or store name or the like can be input), date (if the date is not input, the current time will be used as the start time), and the search options. The user enters the "name of the toy store" as the destination. Furthermore, the user selects "escalator priority" and "low congestion route priority" as the search options in the user input screen (301).

In the user profile screen (302), the user profile of the user is transmitted from the server (201) based on the success of user authentication. Alternatively, the user profile of the first user is retrieved from the storage device of the terminal device (101) based on the success of user authentication. The user can add, change, or delete the user profile if additions, changes, or deletions of the user profile are necessary. The current user profile includes "do not take stairs" and "using baby stroller".

The user clicks or touches or the like the "search route guide". on the user input screen (301), to request the server (201) to search for a guide.

The server (201) creates route guide information based on the BIM data, security information for the route, and user profile, as well as optionally access restriction information to the security information and/or BIM data, use restriction information for the route, search option information, external information, and route guides previously used by the user. The server (201) extracts from the BIM data various types of information for the route (in this embodiment, escalator location, operating direction of the escalator at the present time, and escalator operating status, for example). Furthermore, the server (201) can optionally use congestion simulation results calculated by using the BIM data (for example escalator or elevator congestion, passageway congestion, and congestion of candidate passageways or routes). The server (201) can create one or a plurality of route guide information, while considering the current time (14:00) and the search options "escalator preference" and "low congestion route priority". With the present embodiment, the server (201) confirms that of escalator A and B, escalator A is closer to the destination, that escalator A is currently operating, and that escalator A is operating downward from the third floor to the second floor. Furthermore, the server (201) can calculate the estimated time of arrival based on, for example, the total distance from the starting point to the destination, the walking speed of the user, and the congestion simulation results.

The server (201) transmits to the terminal device (101) one or a plurality of route guide information that was created.

The user can select any one of the route guides if a plurality of route guides are presented.

The server (201) can transmit to the terminal device (101) the route guide information that corresponds to the route guide selected by the user. Furthermore, the server (201) can attach precaution information to the route guide information, and transmit to the terminal device (101).

Figure 3B:
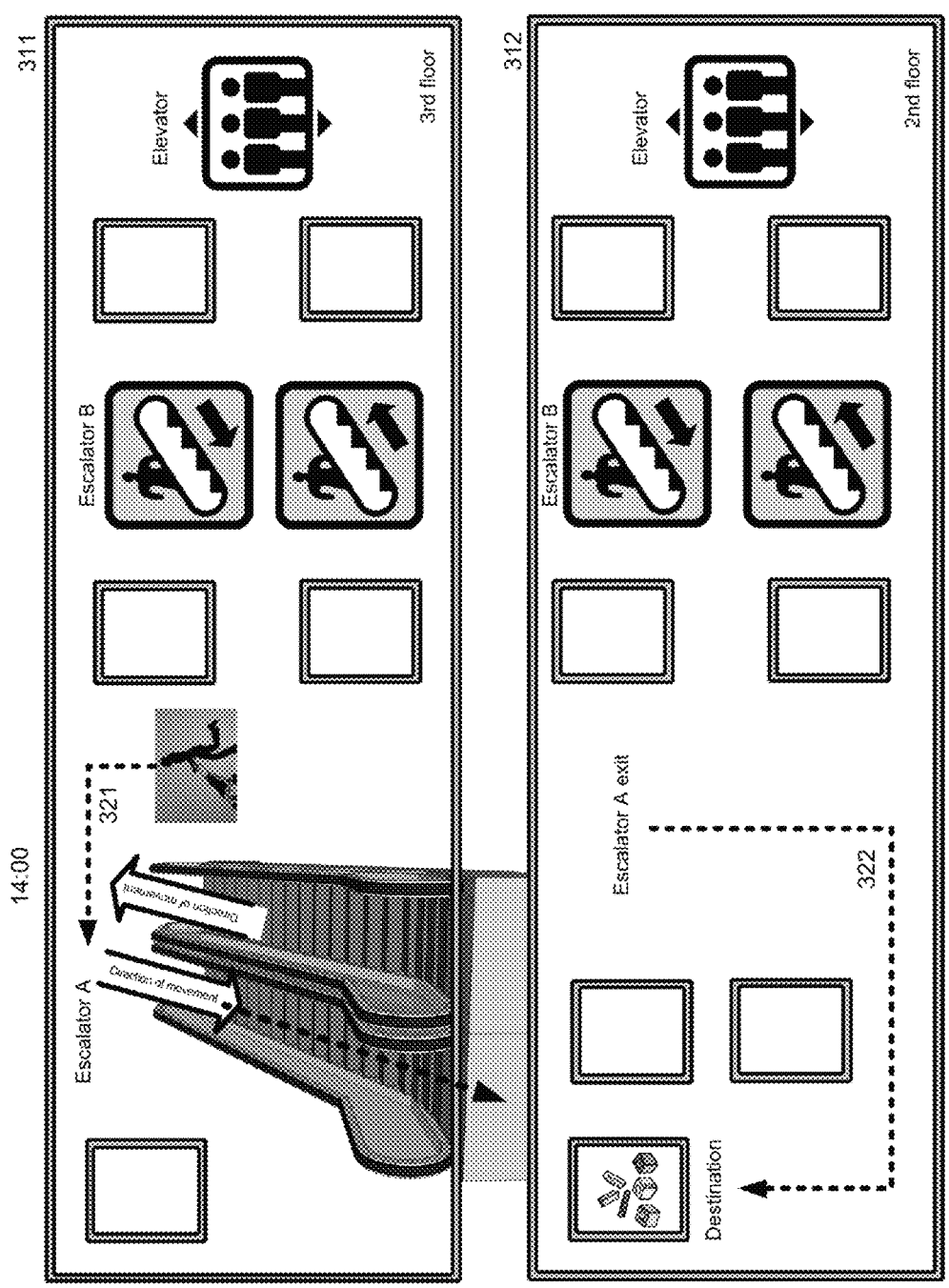
FIG. 3B illustrates a route guide that is displayed on a mobile terminal as the results of the guide search illustrated in FIG. 3A, in accordance with an aspect of the present invention.

FIG. 3B illustrates a route guide that is displayed on a mobile terminal as the result of the guide search illustrated in FIG. 3A, in accordance with an aspect of the present invention.

The terminal device (101) displays the route guide to the destination based on the route guide information received from the server (201). The terminal device (101) indicates by a dotted line (321 and 322) the route that uses escalator A as the route to the destination (311 and 312).

The terminal device (101) can display the precautionary information for the route over the route guide if necessary, and can provide guidance using audio. The precautionary information includes, for example, "Please hold the baby stroller when using the escalator".

FIG. 3C illustrates a screen for the same user as in FIG. 3A to input or set in a terminal device (101) the information necessary for requesting a route guide to the same destination as FIG. 3A but at a different time, in accordance with an aspect of the present invention.

The user launches an application for route guidance on the terminal device (101) at 15:55.

The user authentication process is as described above in the description of FIG. 3A.

The user selects or inputs in the user input screen (331) the starting point (facility name, room name, store name, or the like is input, but if a starting point is not input, the current position is taken as the starting point), destination, midway point, date (if the date is not input, the current time will be used as the start time), and the search options. The user enters the "name of the toy store" as the destination. Furthermore, the user selects "escalator priority", "low congestion route priority", and "both hands full" as the search options in the user input screen (331).

The user clicks or touches or the like the "search route guide". on the user input screen (331), to request the server (201) to search for a guide.

The server (201) creates route guide information based on the BIM data, security information for the route, and user profile, as well as optionally access restriction information to the security information and/or BIM data, use restriction information for the route, search option information, external information, and route guides previously used by the user. The server (201) extracts from the BIM data various types of information for the route (in this embodiment, escalator location, operating direction of the escalator at the present time, escalator operating status, and congestion, for example). Furthermore, the server (201) can optionally use congestion simulation results calculated by using the BIM data (for example escalator or elevator congestion, and route congestion). The server (201) can create one or a plurality of route guide information, while considering the current time (18:00), the search options "escalator preference", "low congestion route priority", and "both hands full". With the present embodiment, the server (201) confirms that of escalator A and B, escalator A is closer to the destination, but that escalator A is operating upward from the second floor to the third floor, because of the commute time band. Therefore, the server (201) selects escalator B and the elevator as candidates from the BIM data and the like. However, the server (201) receives the information from the BIM data and the like that escalator B is extremely congested. Therefore, the server (201) generates route guide information via the elevator as a first candidate for the route guide, and route guide information via the escalator B as the second candidate for the route guide. Furthermore, the server (201) can calculate the estimated time of arrival for the first candidate and the second candidate, based on, for example, the total distance from the starting point to the destination, the walking speed of the user, and the congestion simulation results.

The server (201) transmits to the terminal device (101) the route guide information that was created for the first candidate and the second candidate.

The user selects the route guide of the second candidate from the route guides based on the route guide information of the first candidate and the second candidate.

The server (201) can transmit to the terminal device (101) the route guide information that corresponds to the route guide of the second candidate that was selected by the user.

Figure 3D:
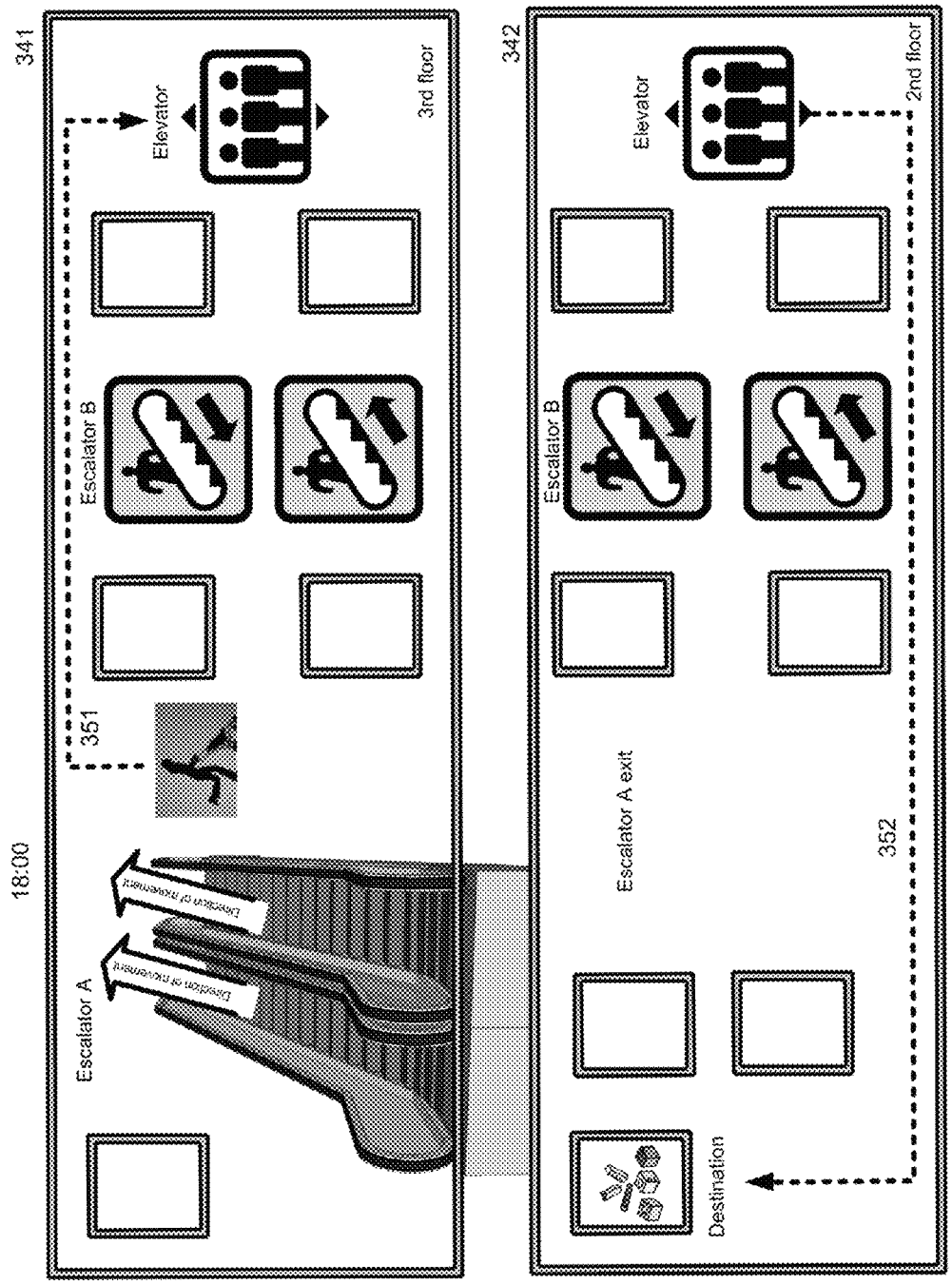
FIG. 3D illustrates a route guide that is displayed on a mobile terminal as the result of the guide search illustrated in FIG. 3C, in accordance with an aspect of the present invention.

FIG. 3D illustrates a route guide that is displayed on a mobile terminal as the result of the guide search illustrated in FIG. 3C, in accordance with an aspect of the present invention.

The terminal device (101) displays the route guide to the destination based on the route guide information of the first candidate received from the server (201). The terminal device (101) indicates by a dotted line (351 and 352) the route that uses the elevator as the route to the destination (341 and 342).

As described above, in accordance with the aspects of the present invention illustrated in FIG. 3A through FIG. 3B and FIG. 3C through FIG. 3D, even though the same user requested a route guide for traveling to the same destination, the route guide provided different routes (including detour route) optimal for the user at the requested point in time in accordance with the information from the BIM data, search options, and user profile.

Two embodiments illustrated in FIG. 4A through FIG. 4B and FIG. 4C through FIG. 4D are examples where different routes are provided based on the user profiles of the first user and the second user, in accordance with an aspect of the present invention.

FIG. 4A illustrates a screen for a first user that belongs to the development department of OO Company to set the information necessary for requesting a route guide on the terminal device (101) in accordance with an aspect of the present invention.

The first user is at the third-floor ticket gate of the Central Train Station. The first user wishes to travel to a conference room (inside the security area) on the 16th floor of the Central Tower North Building in order to attend a meeting held at the headquarters of OO Company. The first user launches an application for route guidance on the terminal device (101) at 12:45.

The route guide application begins authentication of the first user if necessary. The first user inputs into the terminal device (101) a user ID and optional password required for receiving the route guide service. Alternatively, the first user performs biometric certification on the terminal device (101).

The terminal device (101) receives the user input based on successful authentication of the user.

The user authentication process is as described above in the description of FIG. 3A.

The user selects or inputs in the user input screen (401) the starting point, destination, midway point, date, and the search options. The user enters the "Central Tower North Building Floor 16 conference room" as the destination. Furthermore, the first user selects "elevator priority" and "shortest route priority" as the search options in the user input screen (401).

In the user profile screen (402), the user profile of the first user is transmitted from the server (201) based on the success of user authentication. Alternatively, the user profile of the first user is retrieved from the storage device of the terminal device (101) based on the success of user authentication. The first user can add, change, or delete the user profile if additions, changes, or deletions of the user profile are necessary. The current user profile includes "employee of OO Company", "Employee ID" and "Development Department".

The first user clicks or touches or the like the "search route guide". on the user input screen (401), to request the server (201) to search for a guide.

The server (201) creates route guide information based on the BIM data, security information for the route, and user profile, as well as optionally access restriction information to the security information and/or BIM data, use restriction information for the route, search option information, external information, and route guides previously used by the first user. The server (201) extracts from the BIM data various types of information for the route (in this embodiment, entry permission to a security area, location of the security application, Central Train Station, Central Power South Building, and Central Power North Building elevator location, the stopping floors of each elevator at the current time, and the operating status of each elevator, for example). Furthermore, the server (201) can optionally use congestion simulation results calculated by using the BIM data (for example congestion of each elevator, and congestion of candidate passageways or routes). The server (201) can create one or a plurality of route guide information, while considering the current time (12:45) and the search options "elevator priority", and "shortest distance". In this example, the server (201) determines from the BIM data and the like that the first user has not received entry permission to the security area inside the company. The server (201) searches for a guide route to the Central Tower North Building floor 16 conference room after applying for entry to the security area at the Central Tower South Building first floor Security Center (which is a midway point). Furthermore, the server (201) can calculate the estimated time of arrival based on, for example, the total distance from the starting point to the midway point, and from the midway point to the destination, the walking speed of the first user, the congestion of the security area, and the congestion simulation results.

The server (201) transmit to the terminal device (101) one or a plurality of route guide information that was created.

The first user can select any one of the route guides if a plurality of route guides are presented.

The server (201) can transmit to the terminal device (101) the route guide information that corresponds to the route guide selected by the first user. Furthermore, the server (201) can attach precaution information to the route guide information, and transmit to the terminal device (101).

Figure 4B:
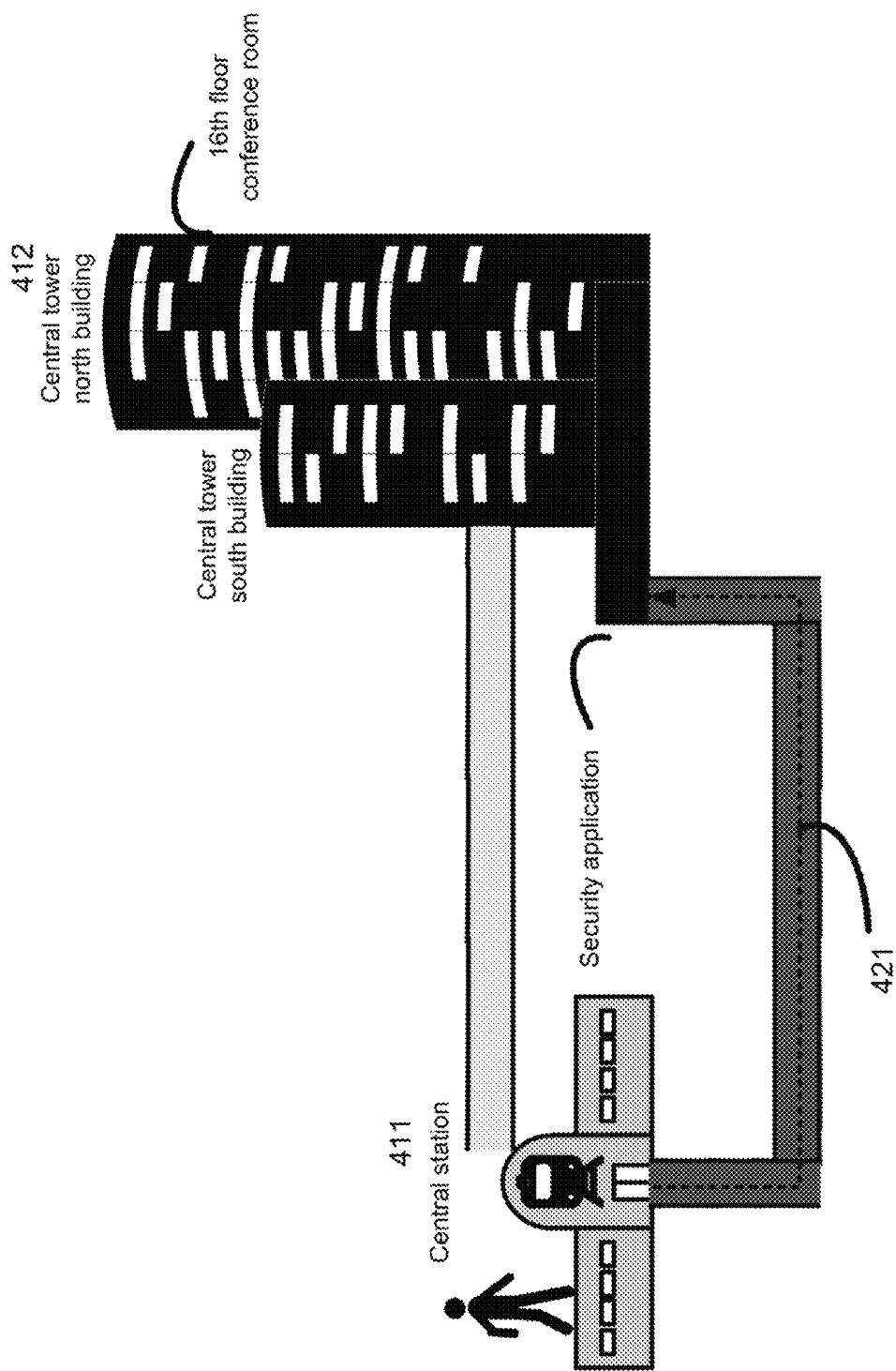
FIG. 4B illustrates a route guide that is displayed on a mobile terminal as the result of the guide search illustrated in FIG. 4A, in accordance with an aspect of the present invention.

FIG. 4B illustrates a route guide that is displayed on a mobile terminal (101) as the results of the guide search illustrated in FIG. 4A, in accordance with an aspect of the present invention.

The terminal device (101) displays the route guide to the destination based on the route guide information received from the server (201). The terminal device (101) indicates the route to the destination via the Security Center on the first floor of the Central Tower South Building, using a dotted line (421) for example. Furthermore, the terminal device (101) can also display the route from the Security Center on the first floor of the Central Tower South Building to the destination, based on completion of the application to enter the security area by the first user. Furthermore, once the application to enter the security area is completed, the terminal device (101) can also display a modified route if the route that can reach the destination from the Security Center on the first floor of the Central Tower South Building in the shortest time changes.

The terminal device (101) can display the precautionary information for the route over the route guide if necessary, and can provide guidance using audio. The precautionary information includes, for example, "Please proceed to the destination after completing an application to enter the security area", and "Please apply for entry to the security area by following the procedures shown below. (Hereinafter omitted)".

FIG. 4C illustrates a screen for a second user with a different user profile than FIG. 4A to set the information necessary for requesting a route guide on the terminal device (101) in accordance with an aspect of the present invention.

The second user is at the third-floor ticket gate of the Central Train Station. Similar to the first user, the second user wishes to travel to a conference room (inside the security area) on the 26th floor of the Central Tower North Building in order to attend a meeting held at the headquarters of OO Company. The first user launches an application for route guidance on the terminal device (101) at 12:25.

The second user authentication process is as described above in the description of FIG. 4A.

The user authentication process is as described above in the description of FIG. 3A.

The second user selects or inputs in the user input screen (431) the starting point, destination, midway point, date, and the search options. The second user enters the "Central Tower North Building Floor 16 conference room" as the destination. Furthermore, the first user selects "elevator priority" as the search options in the user input screen (431).

In the user profile screen (432), the user profile of the first user is transmitted from the server (202) based on the success of user authentication. Alternatively, the user profile of the second user is retrieved from the storage device of the terminal device (101) based on the success of user authentication. The second user can add, change, or delete the user profile if additions, changes, or deletions of the user profile are necessary. The current user profile includes "employee of OO Company", "Employee ID" and "Sales Department".

The second user clicks or touches or the like the "search route guide". on the user input screen (431), to request the server (201) to search for a guide.

The server (202) creates route guide information based on the BIM data, security information for the route, and user profile, as well as optionally access restriction information to the security information and/or BIM data, use restriction information for the route, search option information, external information, and route guides previously used by the second user. The server (201) extracts from the BIM data various types of information for the route (in this embodiment, entry permission to a security area, location of the security application, Central Train Station, Central Power South Building, and Central Power North Building elevator location, the stopping floors of each elevator at the current time, and the operating status of each elevator, for example). Furthermore, the server (201) can optionally use congestion simulation results calculated by using the BIM data (for example congestion of each elevator, and congestion of candidate passageways or routes). The server (201) can create one or a plurality of route guide information, while considering the current time (12:30) and the search option "elevator priority". In this example, the server (202) determines from the BIM data and the like that the second user has received entry permission to the security area inside the company. The server (201) searches for a route from the third floor of the Central Train Station to the conference room on the 16th floor of the Central Tower North Building via a direct route to the third-floor of the Central Tower South Building. Furthermore, the server (201) can calculate the estimated time of arrival based on, for example, the total distance from the starting point to the destination, the walking speed of the second user, and the congestion simulation results.

The server (201) transmit to the terminal device (101) one or a plurality of route information that was created.

The second user can select any one of the route information if a plurality of route guides are presented.

The server (201) can transmit to the terminal device (101) the route guide information that corresponds to the route information selected by the second user. Note that if there is only one route information, the server (201) can transmit to the terminal device (101) that route information and the associated guide information.

Figure 4D:
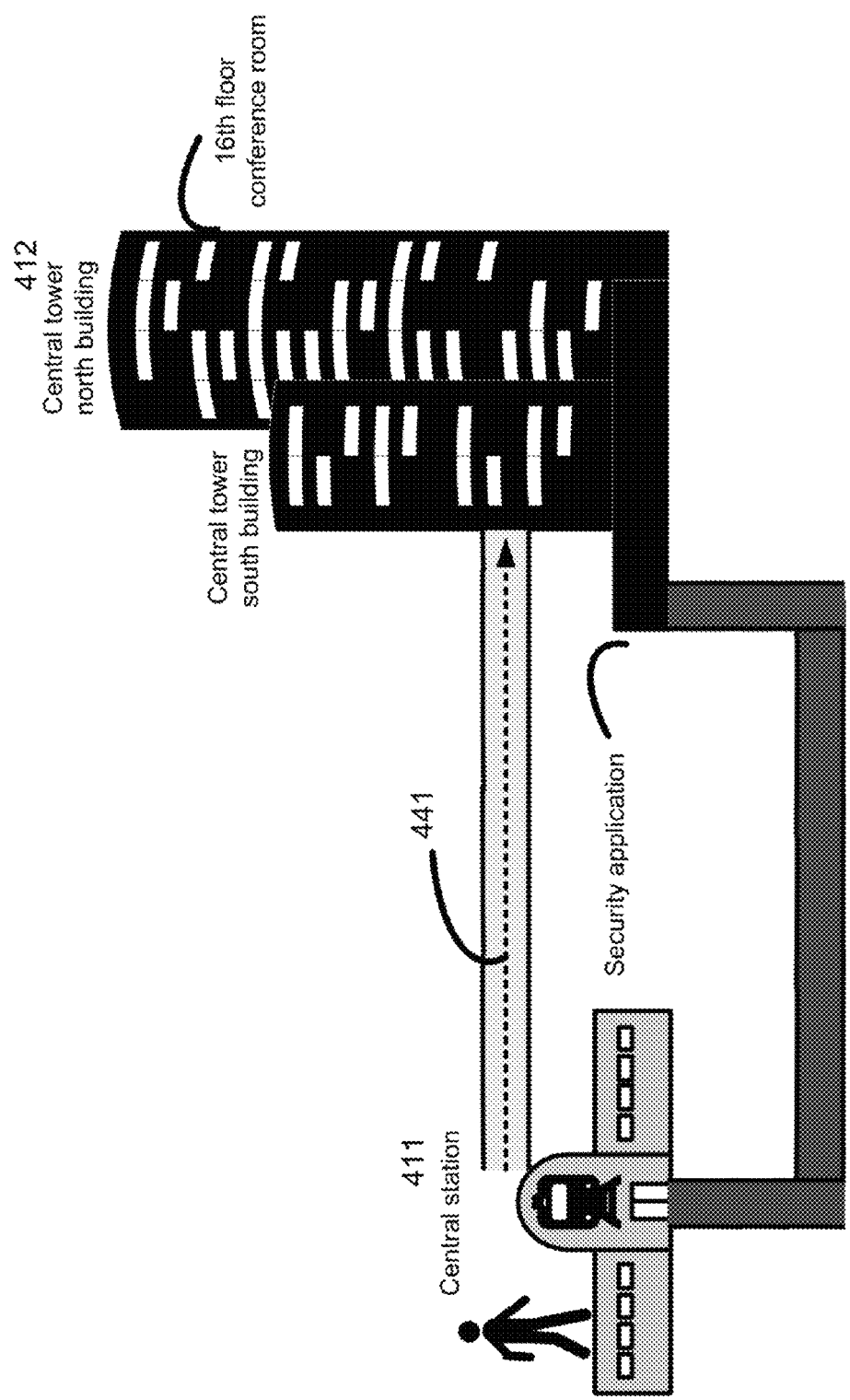
FIG. 4D illustrates a route guide that is displayed on a mobile terminal as the result of the guide search illustrated in FIG. 4C, in accordance with an aspect of the present invention.

FIG. 4D illustrates a route guide that is displayed on a mobile terminal (101) as the results of the guide search illustrated in FIG. 4C, in accordance with an aspect of the present invention.

The terminal device (101) displays the route guide to the destination based on the route guide information received from the server (201). The terminal device (101) displays the shortest route from the third floor of the Central Train Station to the conference room on the 16th floor of the Central Tower North Building via a direct route to the third-floor of the Central Tower South Building, using a dotted line (441).

The terminal device (101) can display the precautionary information (for example building entry information) for the route superimposed on the route guide if necessary, and can provide guidance using audio. The precautionary information includes, for example, "Please prepare employee card in order to pass the security gate". Alternatively, the terminal device (101) can display link information for a URL that provides building entry information, superimposed on the route guide. Furthermore, the terminal device (101) can link to the building entrance management system and push the building entrance information to the user.

As described above, in accordance with the aspects of the present invention illustrated in FIG. 4A through FIG. 4B and FIG. 4C through FIG. 4D, even though different users requested a route guide for traveling to the same destination, the route guide provided different routes and building entry information optimal for each user at the requested point in time in accordance with the information from the BIM data, search options, and user profile.

FIG. 5A illustrates an example of access restriction information to BIM data and security information, that can be used in an aspect of the present invention.

The server (201) can control access to the BIM data based on the attribute information units of the BIM data. Furthermore, the server (201) can restrict access to the security information based on the user unit. The access restriction is performed using, for example, access restriction information and, for example, the access restriction list.

In the access restriction list (501) illustrated in FIG. 5A, access restrictions for each user are set based on various objects (first floor general gate, first floor employee gate, third-floor, and passageway A (company A), and the attribute information for the fourth floor A (company B) (in other words based on the BIM data).

Information concerning how the access restrictions of each attribute information is packaged can reference, for example, DB2 LBAC (Label-based Access Control) and DB2 RCAC (Row and Column Access Control).

In the access restriction list (501) illustrated in FIG. 5A, the facility supervisor can access all of the attribute information for each object illustrated in FIG. 5A. Company A employees can access a part of the attribute information for each object (first floor general gate, first floor employee gate, third-floor common passageway A, and third-floor A (Company A), but cannot have any access whatsoever to any of the attribute information for some objects (fourth floor A (Company B)) because they are outside people. Company B employees can access a part of the attribute information for each object (first floor general gate, first floor employee gate, third-floor common passageway A, and fourth floor A (Company B), but cannot have any access whatsoever to any of the attribute information for some objects (third floor A (Company A)). Company A visitors (with preapproval) can access a part of the attribute information for each object (first floor general gate, first floor employee gate, third-floor common passageway A, and third-floor A (Company A), but cannot have any access whatsoever to any of the attribute information for some objects (fourth floor A (Company B)). Company A visitors (without preapproval) can access a part of the attribute information for each object (first floor general gate, and first floor employee gate), but cannot have any access whatsoever to any of the attribute information for some objects (third-floor common passageway A, third-floor A (company A), and fourth floor A (Company B)). A general user can access a part of the attribute information for each object (first floor general gate), but cannot have any access whatsoever to any of the attribute information for some objects (first floor employee gate, third-floor common passageway A, third-floor A (company A), and fourth floor A (Company B)).

Figure 5B:
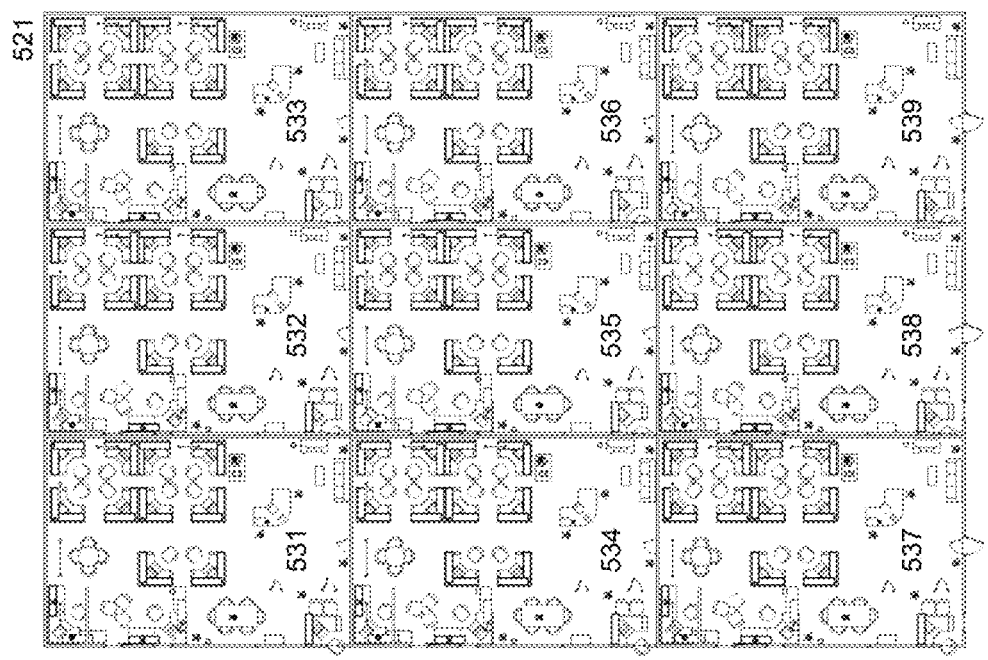
FIG. 5B illustrates an example of a map of a route guide that can be displayed on a mobile terminal in accordance with the access restriction list illustrated in FIG. 5A, in accordance with an aspect of the present invention.
Figure 5B:
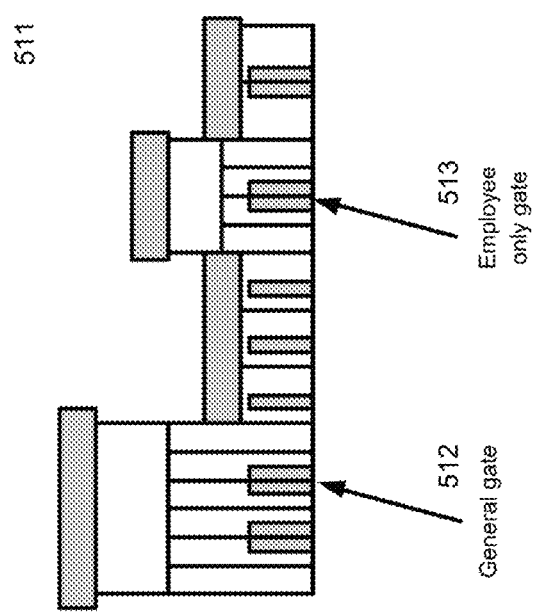

FIG. 5B illustrates an example of a map of a route guide that can be displayed on a mobile terminal (101) of an employee of company A in accordance with the access restriction list illustrated in FIG. 5A, in accordance with an aspect of the present invention.

The server (201) transmits to the terminal (101) of an employee of Company A route guide information created using the access restriction list (501) illustrated in FIG. 5A. When creating the route guide information, the Company A employee is not restricted from accessing the BIM data for the first floor general gate and the first floor employee gate, so the server (201) includes the first floor general gate and the first floor employee gate in the route guide information. Furthermore, the employee of Company A is not restricted from accessing the BIM data for the third-floor A (Company A), so the server (201) includes all of the floor plan of the third-floor A (531 through 539) in the route guide information.

The terminal (101) of the Company A employee will display the first floor employee gate (513) in addition to the first floor general gate (512) (511). Furthermore, the terminal (101) of the Company A employee will display all of the map (531 through 539) for it the floor plan (531 to 539) of the third-floor A.

Figure 5C:
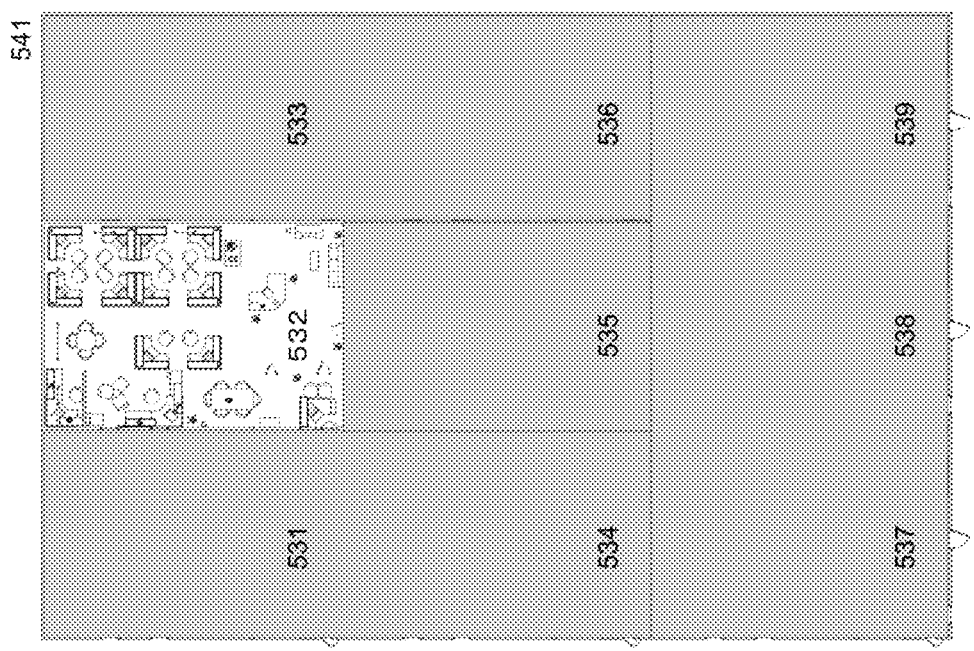
FIG. 5C illustrates an example of a map of a route guide that can be displayed on a mobile terminal in accordance with the access restriction list illustrated in FIG. 5A, in accordance with an aspect of the present invention.
Figure 5C:
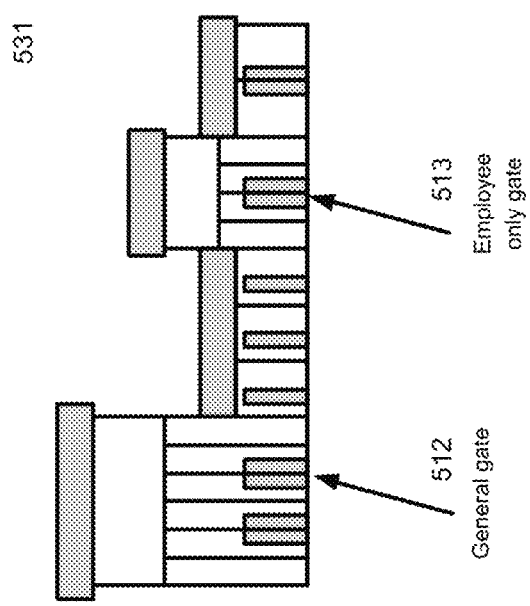

FIG. 5C illustrates an example of a map of a route guide that can be displayed on a mobile terminal (101) of an employee of company B in accordance with the access restriction list illustrated in FIG. 5A, in accordance with an aspect of the present invention.

The server (201) transmits to the terminal (101) of an employee of Company A route guide information created using the access restriction list (501) illustrated in FIG. 5A. When creating the route guide information, the Company B employee is not restricted from accessing the BIM data for the first floor general gate and the first floor employee gate, so the server (201) includes the first floor general gate and the first floor employee gate in the route guide information. Furthermore, the employee of Company B is not restricted from accessing the BIM data for the third-floor common passageway A (532), but is restricted from accessing the BIM data for the third-floor A (Company A) (531 and 533 through 539), so the server (201) does not include and deletes the floor plans (531 and 533 through 539) other than the common passageway A (532) which is a part of the floor plan (531 through 539) of the third-floor A in the route guide information.

The terminal (101) of the Company B employee will display the first floor employee gate (513) in addition to the first floor general gate (513) (531). Furthermore, the terminal (101) of the Company B employee does not include the floor plan (531 and 533 through 539) in the route guide information, so only the common passageway A (532) which is a part of the floor plan of the third floor (531 through 539) is displayed, and the other areas of the floor plan (531 and 533 through 539) are not displayed (541).

Figure 5D:
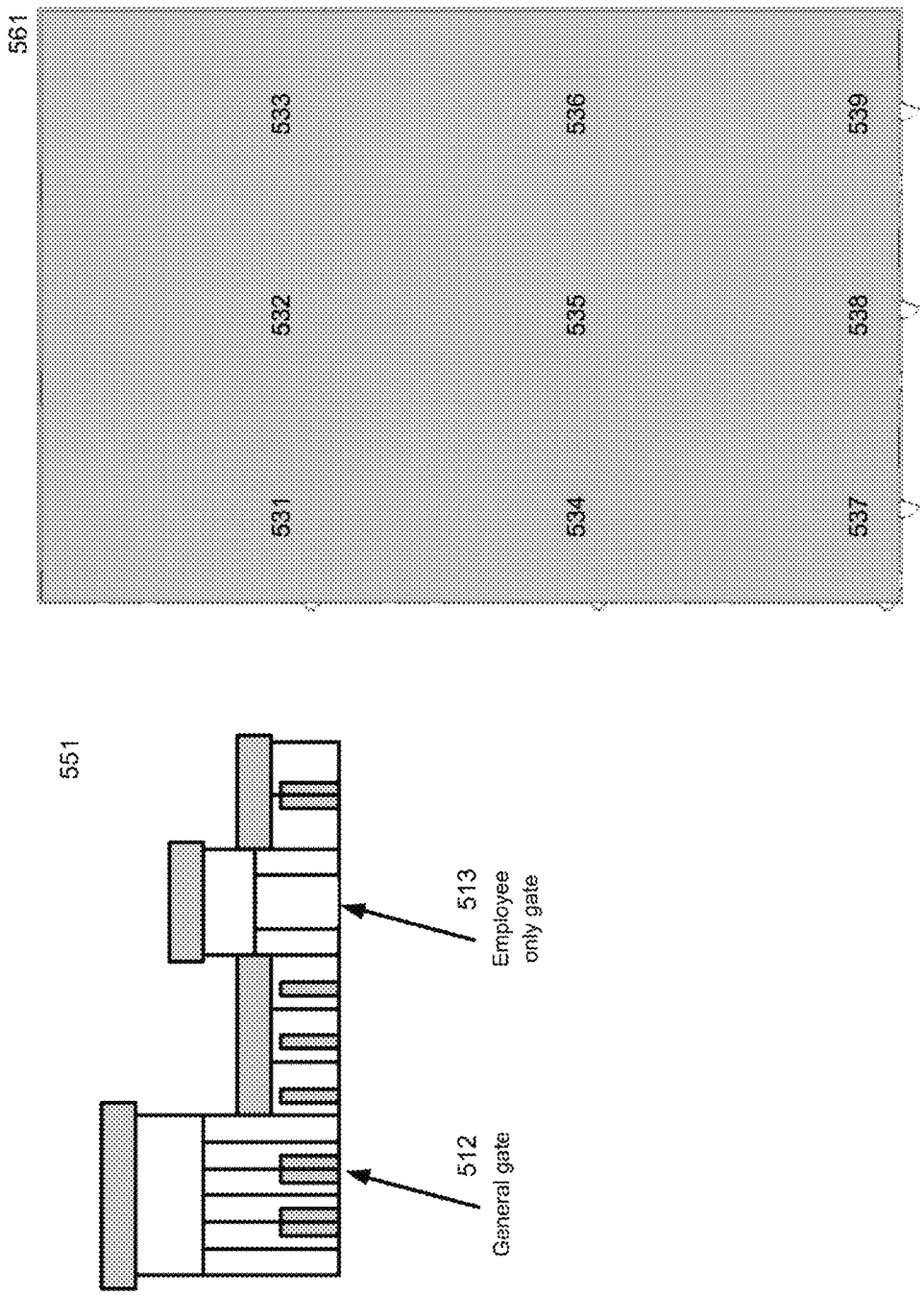
FIG. 5D illustrates an example of a map of a route guide that can be displayed on a mobile terminal in accordance with the access restriction list illustrated in FIG. 5A, in accordance with an aspect of the present invention.

FIG. 5D illustrates an example of a map of a route guide that can be displayed on a mobile terminal (101) of a general user in accordance with the access restriction list illustrated in FIG. 5A, in accordance with an aspect of the present invention.

The server (201) transmits to the terminal (101) of an employee of Company A route guide information created using the access restriction list (501) illustrated in FIG. 5A. When creating the route guide information, the general user is not restricted from accessing the BIM data for the first floor general gate, so the server (201) includes the first floor general gate in the route guide information. On the other hand, the general user is restricted from accessing the BIM data for the first floor employee gate, so the server (201) does not include and deletes the first floor employee gate in the route guide information. Furthermore, the general user is restricted from accessing the BIM data for the third-floor common passageway A and the third-floor A (Company A), so the server (201) does not include and delete all of the floor plan of the third-floor A (531 through 539) in the route guide information.

The terminal (101) of the general user displays only the first floor general gate (512), and does not include the first floor employee gate (513) in the route guide information, so the first floor employee gate (513) is not displayed (551). Furthermore, the terminal (101) of the general user does not include the floor plan (531 through 539) of the third-floor in the route guide information, so none of the floor plan (531 through 539) of the third-floor is displayed (561).

FIG. 6A illustrates an example of BIM data and external information that can be used for determining an impassable route, in accordance with an aspect of the present invention.

Table (601) illustrates external information received from a server that provides weather information when the server (201) searches for a route guide.

Table (611) illustrates the BIM data for an outdoor escalator 1 through 4 at the time that the external data illustrated in Table (601) is received by the server (201). The server (201) can select in real time a passable passageway in combination with the weather conditions by extracting the operating conditions (operating or stopped) and the attribute information of remarks.

FIG. 6B illustrates an example of security information on a route and the BIM data that can be used in order to determine a midway point and a midway point order, in accordance with an aspect of the present invention.

The table (621) includes the attribute information for the BIM data, security information of the route ("security check" and "security management receptionist").

This server (201) extracts "security management receptionist" data "first floor security Center receptionist" because the data for the security information "security check" related to the BIM data "first floor employee gate" is "Y". Furthermore, the server (201) extracts a midway point order rule of "the user must pass through the first floor Security Center receptionist before passing through the first floor employee gate".

The server (201) confirms the "security check", and if the data it is "Y", the data for the "security management receptionist" is extracted, and a route guide showing a route to the midway point (security management receptionist) can be provided by referring to the midway point order rules can be displayed as a priority. Therefore, the user can be shown a route guide for a suitable route of passing through the first floor employee gate after passing by the first floor Security Center receptionist.

Furthermore, the server (201) extracts the "second floor Company A receptionist" data "second floor A" because the data for the security information "security check" related to the BIM data "third-floor conference room door 1" is "Y". Furthermore, the server (201) extracts a midway point order rule of "the user must pass through the second floor Company A receptionist before passing through the third-floor conference room door 1". The server (201) confirms the "security check", and if the data it is "Y", the data for the "security management receptionist" is extracted, and a route guide showing a route to the midway point (second floor Company A receptionist) can be provided by referring to the midway point order rules can be displayed as a priority. Therefore, the user can be shown a route guide for a suitable route of passing through the third-floor conference room 1 door 1 after passing by the second floor Company A receptionist.

On the other hand, the server (201) does not extract the data for the "security management receptionist" because the data for the security information "security check" related to the BIM data "third-floor passage A automatic door 1" is set to "N".

Figure 6C:
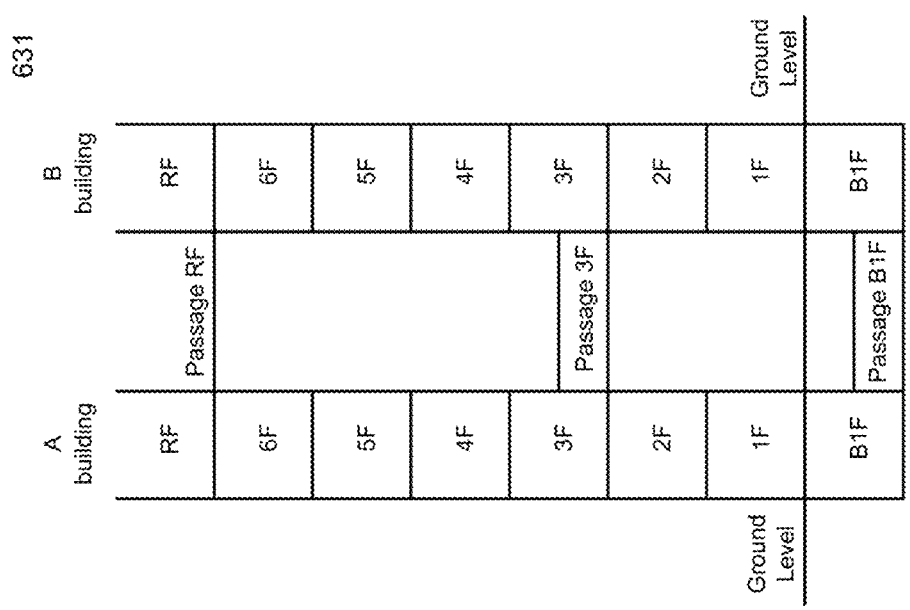
FIG. 6C illustrates an example of access restriction information to BIM data, that can be used in an aspect of the present invention.

FIG. 6C illustrates an example of access restriction information to BIM data and an example of route information that is created in accordance with this access restriction information, that can be used in an aspect of the present invention.

The two buildings (631) each have six floors in building A and building B, and building A and building B are mutually connected by passageway B1F, passageway 3F, and passageway RF.

The access restriction information (641) to the BIM data shows access restriction information for the attribute information of each object in the building (631). In the table, O indicates that the attribute information data can be obtained, and X indicates that the attribute information data it cannot be obtained.

The server (201) can create the following route information based on the access restriction information (641) to the BIM data, and can transfer this information to the terminal device (101).

(1) Case of Moving from the Sixth Floor of Building A to the Sixth Floor of Building B A supervisor can receive all of the data for "name" and "width and height" for the attribute information of the passageway RF, so a route that passes through passageway RF can be selected.

Employees and visitors can receive the data for the "name" of the attribute information of the passageway RF but cannot receive the data for the "width and height" of the attribute information of the passageway RF, so a route that passes through the passageway RF cannot be selected. However, employees and visitors can receive all of the data for the "name" and "width and height" for the attribute information of passageway 3F, so a route that passes through passageway 3F can be selected.

(2) Case of Moving from the First Floor of Building A to the First Floor of Building B (During Sunny Weather)

The supervisor, employees, and visitors can all receive the data for the "name" and "width and height" of the attribute data for the ground-level 1F, so a route that passes through ground-level 1F can be selected.

(3) Case of Moving from the First Floor of Building A to the First Floor of Building B (During Rainy Weather)

The supervisor and the employee can receive all of the data for "name" and "width and height" for the attribute information of the ground-level 1F when the weather is sunny, so a route that passes through ground-level 1F can be selected. However, during rainy weather, the ground-level 1F is wet due to rain, so routes with a roof other than the ground-level route can be selected. The supervisor and the employee can receive all of the data for "name" and "width and height" for the attribute information of the passageway B1 which has a roof, so a route that passes through passageway B1 will be preferentially selected over the ground-level route.

The visitor can receive the data for "name" and "width and height" for the attribute information of the ground-level 1F when the weather is sunny, so a route that passes through ground-level 1F can be selected. However, during rainy weather, the ground-level 1F is wet due to rain, so routes with a roof other than the ground-level route can be selected. The visitor cannot receive all of the data for "name" and "width and height" for the attribute information of the passageway B1F which has a roof, so a route that passes through passageway B1F cannot be selected. The visitor can receive all of the data for "name" and "width and height" for the attribute information of the passageway 3F which has a roof, so a route that passes through passageway 3F will be preferentially selected over the ground-level route.

(4) Handling of Passageway RF

A supervisor can receive all of the data for "name" and "width and height" for the attribute information of the passageway RF, so passageway RF will be displayed, and a route that passes through passageway RF can be selected and used.

Employees and visitors can receive the data for the "name" of the attribute information of the passageway RF so the name of the passageway RF is displayed, but the data for the "width and height" of the attribute information of the passageway RF cannot be received, so a route that passes through the passageway RF cannot be selected and used. Therefore, server (201) will create route information that does not display a route that passes through passageway RF even though passageway RF is specified as a destination or midway point by the employee and the visitor, or the passageway RF is restricted and cannot be specified as a destination or midway point on the terminal device (101).

(5) Handling of Passageway B1F

A supervisor and employees can receive all of the data for "name" and "width and height" for the attribute information of the passageway B1F, so passageway B1F will be displayed, and a route that passes through passageway RF can be selected and used.

A visitor cannot receive all of the data for "name" and "width and height" for the attribute information of the passageway B1F, so passageway B1F will not be displayed, and a route that passes through passageway B1F cannot be selected and used.

Figure 7:
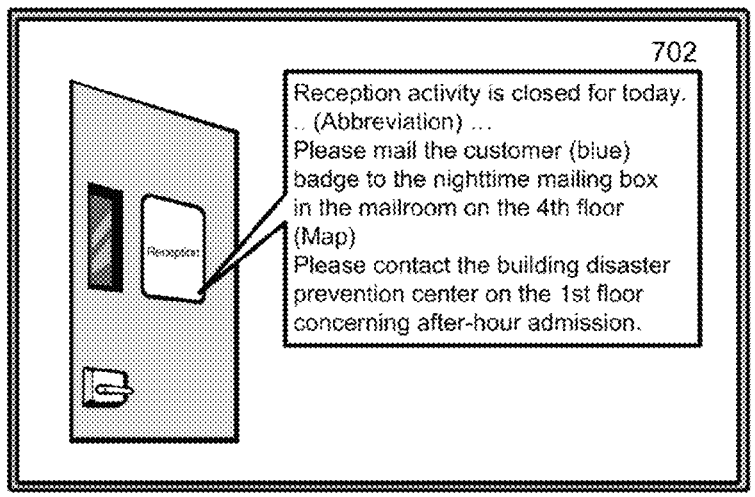
FIG. 7 illustrates an example of superimposing and displaying precaution information while displaying the route guide on the terminal device, in accordance with an aspect of the present invention.
Figure 7:
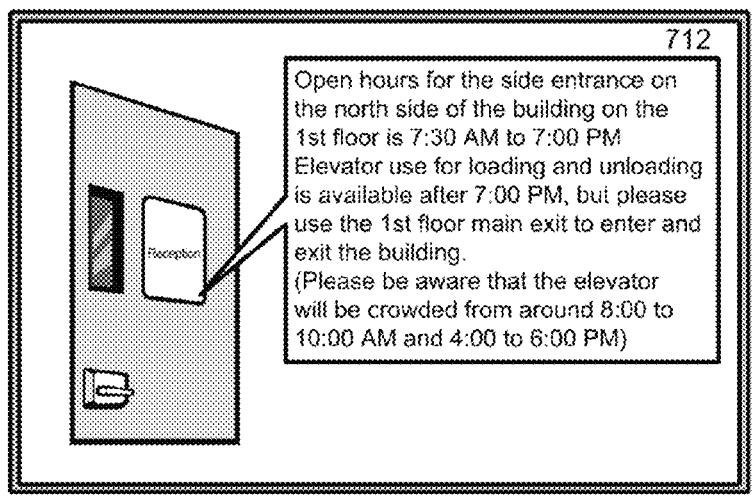
Figure 7:
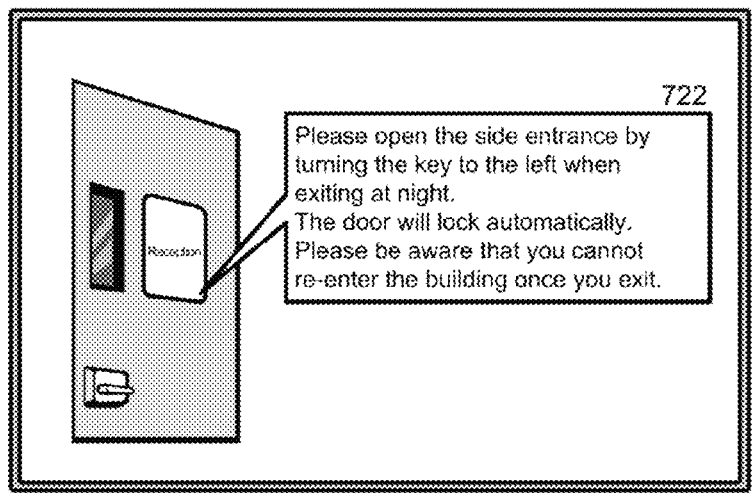

FIG. 7 illustrates an example of superimposing and displaying precaution information while displaying the route guide on the terminal device, in accordance with an aspect of the present invention.

The server (201) can include the method of using the facility equipment in the building, operating method, operating direction, information related to the method of locking or unlocking, and precaution information in the route guide information. Furthermore, the server (201) can use the user profile so as to display information related to the method of using facility equipment in the building, operating method, operating direction, information related to the method of locking or unlocking, and precautionary information only to specific users, and this information will be included only in the route guide information for specific users. The terminal device (101) can display by superimposing the method of using the facility equipment in the building, operating method, operating direction, information related to the method of locking or unlocking, and precaution information on to the route guide information, depending on the route guide information that is received.

The precautionary information can include a method for entering a restricted area, receptionist locations, method of using or returning entry card, restrictions for reentering after leaving the building, and contact information (such as phone number).

The display screen (701) of the terminal device (101) can superimpose and display precautionary information after the reception work is complete, or of the method to enter the building (702).

The display screen (711) of the terminal device (101) can superimpose and display on the route guide precautionary information (712) for delivery personnel for compound facilities. The server (201) can create route guide information so that the precautionary information (712) is displayed only on the terminal devices (101) of companies that have submitted a delivery notice beforehand.

The display screen (721) of the terminal device (101) can superimpose and display on the route guide precautionary information (722) and the method for unlocking a gate for passing through it night. The server (201) can create route guide information so that the precautionary information (722) is displayed only on the terminal devices (101) of employees that have submitted an overtime notice beforehand.

As in the three examples described above, the server (201) can provide to the appropriate users information related to employee dedicated routes, delivery company dedicated routes, routes that include a building entrance approval process, methods of use for facility equipment in the building such as the building entry process at night, operating information, operating direction, unlocking and locking methods, as well as precautionary information.

Furthermore, the server (201) can push notify and display on the terminal device (101) of the user information related to the method of using facility equipment in the building, operating method, operating direction, unlocking and locking method, as well as precautionary information, in conjunction with real-time information such as user position and weather information, when the user becomes lost or an accident occurs.

Figure 8:
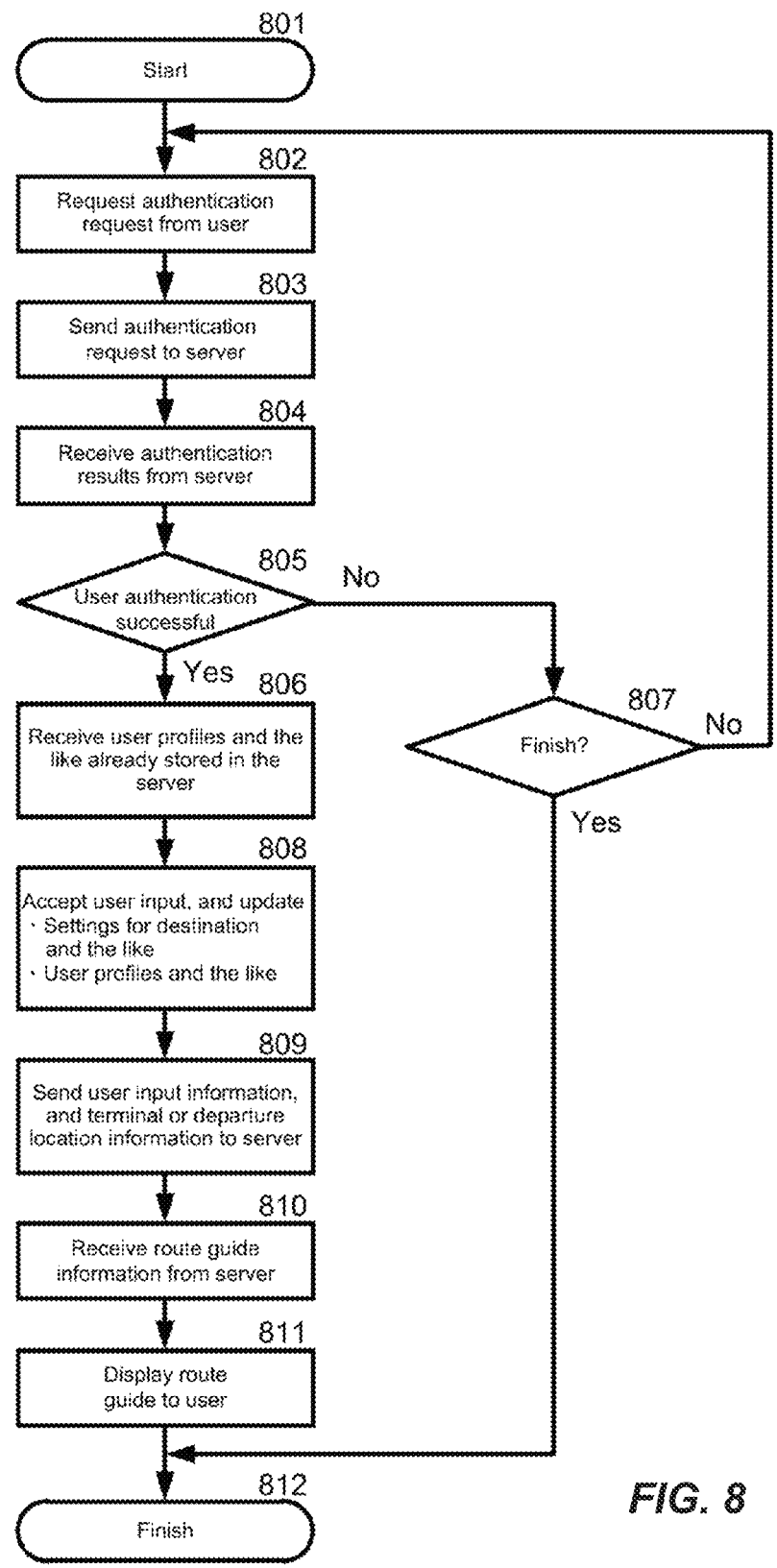
FIG. 8 illustrates a flowchart for a process where the terminal device displays the route guide.

FIG. 8 illustrates a flowchart for a process where the terminal device (101) displays the route guide.

In step 801, the terminal device (101) begins a process for displaying the route guide. This process is started by the user clicking on an icon that is associated with an application for executing the computer program in accordance with an aspect of the present invention on the terminal device (101).

In step 802, the terminal device (101) receives an authentication request from the user. Reception of the authentication request can be performed by clicking on an "authorized" button displayed on the display device of the terminal device (101) after starting the application. Alternatively, reception of the authentication request can be automatically performed by clicking on the application.

In step 803, the terminal device (101) transmits the authentication request received in step 802 from the terminal device (101) to the computer (hereinafter simply referred to as "server") (201). The display device (101) can transmit to the server (201), for example, the authentication ID of the user and optionally a password that is associated with an authentication ID. The authentication ID and/or the password can be encoded by a disclosed key of the server (201) or a private key of the terminal device (101).

In step 804, the terminal device (101) receives the authentication results from the server (201).

In step 805, the terminal device (101) compares the authentication results received in step 803, and determines whether or not user authentication was successful. If user authentication was successful, the terminal device (101) moves the process to step 806. On the other hand, if the user authentication was not successful, the terminal device (101) moves the process to step 807.

In step 806, based on successful user authentication, the terminal device (101) receives the user profile (215) associated with the user that was stored on the server (201), and optionally the search options and route sort order associated with the user, and/or terminal setting information associated with that terminal device (101). Alternatively, the terminal device (101) retrieves from a storage device (127, 108) the user profile associated with the user that was stored on the terminal device (101), and optionally the search options and route sort order associated with the user, and/or terminal setting information associated with that terminal device (101).

In step 807, if user authentication was not successful, the terminal device (101) determines whether or not to terminate the process of displaying the route guide. If the process of displaying the route guide is terminated, the display device (101) will move the process to the termination step 812. On the other hand, if the process of displaying the road guide will not be terminated, the terminal device (101) returns the process to step 802, and the authentication process is repeated in accordance with steps 802 through 805.

In step 808, the terminal device (101) receives a user input from the user of the terminal device. The information that is input by the user (hereinafter also referred to as "user input information") includes the destination, and optionally the starting point, midway point, route sort order, scheduled start time, and/or scheduled arrival time. Furthermore, user input can optionally include updated information for the user profile and/or updated information for the search options.

In step 809, the terminal device (101) transmits to the server (201) the user input information that was received in step 808, and the position information of the terminal or the position information of the starting point (also the starting position information for the route guide). Note that in step 808, if the starting point is not input by the user, the terminal device (101) can transmit to the server (201) information for the current position of the terminal device (101) as the information for the starting point. Furthermore, in step 808, if the scheduled starting time and the scheduled arrival time are not input by the user, the terminal device (101) can transmit to the server (201) the current time as the scheduled start time.

In step 810, the terminal device (101) receives the route guide information from the server (201).

In step 811, the terminal device (101) displays to the user the route guides in accordance with the route guide information that was received in step 809.

In step 812, the terminal device (101) terminates the process for displaying the route guide.

Figure 9A:
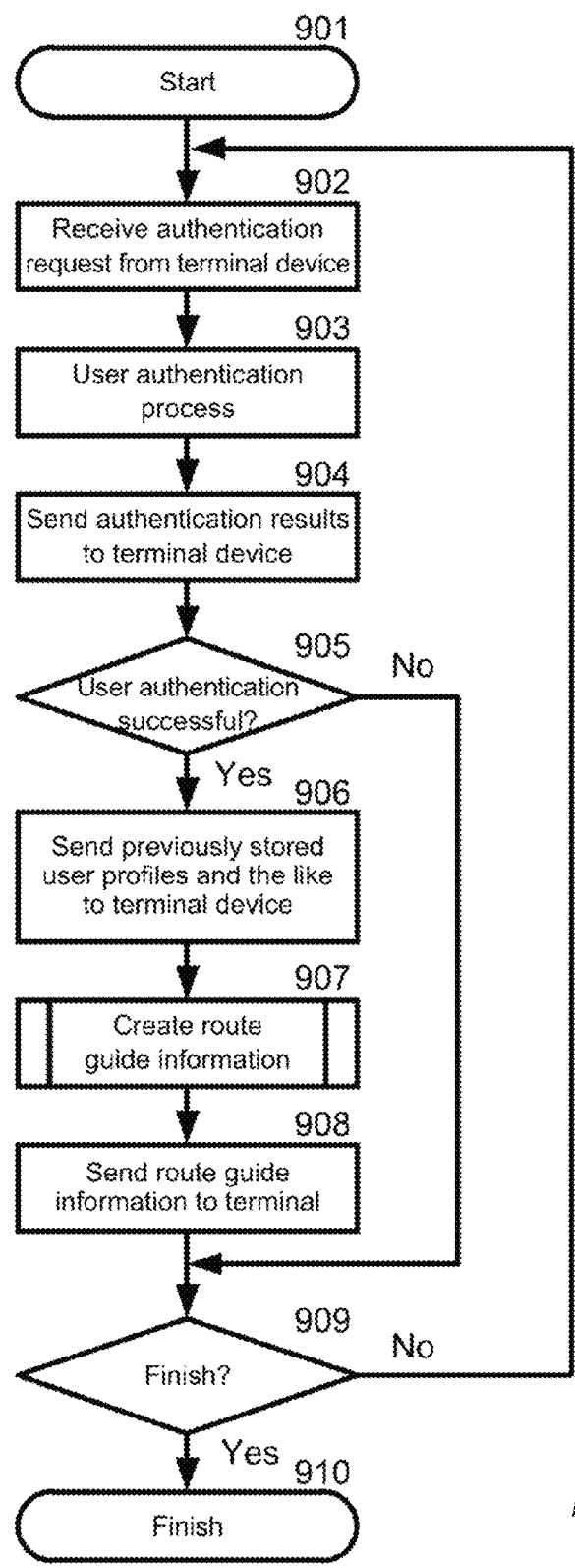
FIG. 9A illustrates a flowchart for a process where the computer provides the route guide when the user begins to use the route guide, in accordance with an aspect of the present invention.
Figure 9B:
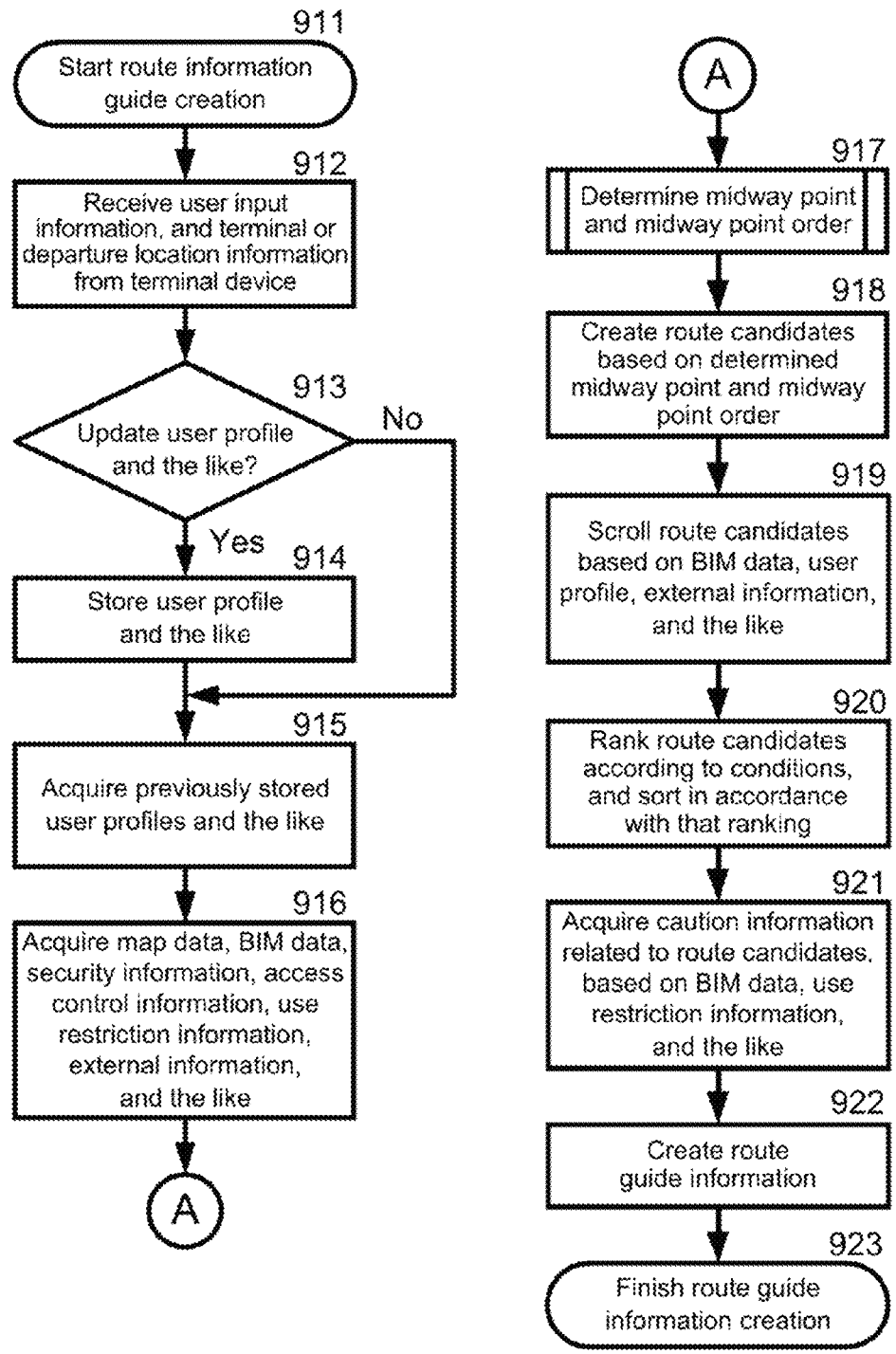
FIG. 9B illustrates a flowchart for a process where the computer provides the route guide when the user begins to use the route guide, in accordance with an aspect of the present invention.
Figure 9C:
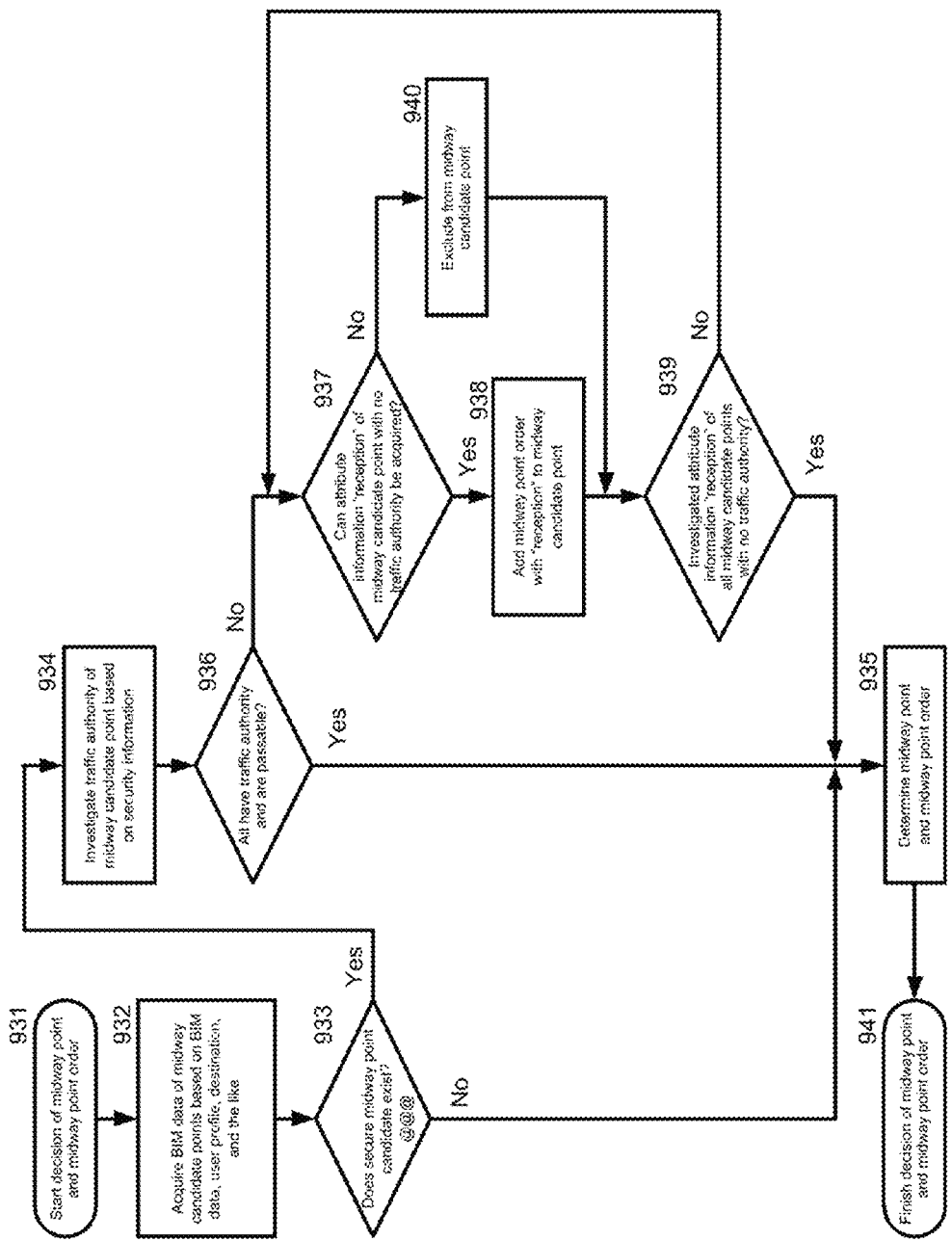
FIG. 9C illustrates a flowchart for a process where the computer provides the route guide when the user begins to use the route guide, in accordance with an aspect of the present invention.

FIG. 9A through FIG. 9C illustrate a flowchart for a process where the computer (201) and provides the route guide when the user begins to use the route guide, in accordance with an aspect of the present invention.

FIG. 9A illustrates the main flowchart from the flowcharts for the processes that provide the route guide.

In step 901, the computer (201) begins a process for providing a route guide to the terminal devices (101).

In step 902, the computer (201) receives from any one terminal device (101) an authentication request of step 803 illustrated in FIG. 8.

In step 903, the computer (201) performs a user authentication process based on the receipt of an authentication request. The authentication process can be performed by example by using the password ID from the terminal device (101) that was received with the authentication request, and any password that is associated with the authentication ID. If the authentication ID and/or the password are encrypted by a published key of the server (201) or a private key of the terminal device (101), the computer (201) can perform encryption using the private key of the server (201) or the published key of the terminal device (101).

In step 904, the computer (201) can transmit to the terminal device (101) the authentication results where authentication was approved, based on the authentication ID that was registered in the server from the terminal device (101).

Alternatively, the computer (201) can transmit to the terminal device (101) the authentication results where authentication was approved, based on the authentication ID from the terminal device (101) matching the password that was registered in the server, or a password from the terminal device (101). On the other hand, the computer (201) can transmit to the terminal device (101) the authentication results where authentication was not approved, based on the authentication ID not being registered in the server from the terminal device (101). Alternatively, the computer (201) can transmit to the terminal device (101) the authentication results where authentication was not approved, based on the authentication ID from the terminal device (101) not matching the password that was registered in the server, or a password from the terminal device (101).

In step 905, the computer (201) moves the process to step 906 based on the authentication results that authentication is approved. On the other hand, the computer (201) moves the process to step 909 that determines the process is terminated if the authentication results show that authentication is not approved.

In step 906, the computer (201) transmits to the terminal device (101) the stored user profile (215) based on the authentication result that authentication is approved. The stored user profile (215) can be registered during a previous communication with the terminal device (101).

In step 907, the computer (201) creates the route guide information. Details about the process of creating the route guide information are described below in the description for FIG. 9B and FIG. 9C.

In step 908, the computer (201) transmits to the terminal device (101) the route guide information that was created in step 907. The computer (201) terminates the process for providing the route guide to the terminal device (101) based on transmission to the terminal device (101) of the route guide information that was created in step 907.

In step 909, the computer (201) determines whether or not to terminate the process of providing a route guide to the terminal device (101). The computer (201) moves the process to termination step 910 if the process for the display devices (101) are terminated. Termination of the processes for the terminal devices (101) can be performed by the supervisor of the computer (201) stopping the computer program that packages the processes in order to perform maintenance on the computer (201), or by the supervisor of the computer (201) turning off the power to the computer (201) because of problems such as hardware trouble or the like of the computer (201). On the other hand, the computer (201) will return the process to step 902 if the processes for it the terminal devices (101) will not be terminated (or in other words if the processes for the terminal devices (101) will be continued).

In step 910, the computer (201) terminates the process for providing the route guide.

FIG. 9B and FIG. 9C illustrate a flowchart for the process of creating the route guide information (step 907), from the flowcharts for the processes that provide the route guide illustrated in FIG. 9A.

In step 911, the computer (201) begins a process for creating route guide information for to the terminal devices (101).

In step 912, the computer (201) receives from any one terminal device (101) the user input of step 809 illustrated in FIG. 8 and the position information of the terminal or the position information of the starting point (also the starting position information for the route guide).

In step 913, the computer (201) determines whether or not the user input information that was received in step 912 includes updated user profile information that was stored in the computer (201) and/or updated search option information. The computer (201) moves the process to step 914, based on the user input information including updated information. On the other hand, if updated information is not included in the user input information, the process proceeds to step 915.

In step 914, the computer (201) replaces the user profile (215) stored in the computer (201) and/or the search option information (216) with the updated user profile and/or search option information, based on the user input information that included updated information.

In step 915, the computer (201) retrieves the user profile (215) that was stored in the computer (201) and/or the search option information (216) to memory (203) for example.

In step 916, the computer (201) retrieves the map data, BIM data, security information of the route, the user profile associated with the user of the terminal device (101) and optionally access restriction information to the BIM data and/or security information, use restriction information for the route, external information and/or search option information to memory (203) for example.

In step 917, the computer (201) determines one or a plurality of midway points and the midway point order until the destination, based on the starting point and destination, and on the information retrieved in step 916. The details concerning the process of determining the midway point and midway point order is described in the description for the following FIG. 9C.

In step 918, the computer (201) creates one or a plurality of route candidates from one or a plurality of midway points and midway point order that were determined in step 917. Specifically, for example, the computer (201) creates route candidates that pass through a security gate by passing through an building entrance application receiving site (midway point) in order for a user that does not have permission to pass through a security gate to apply to enter the building.

In step 919, the computer (201) scores the one or plurality of route candidates that were created in step 918 based on the BIM data, security information of the route, the user profile associated with the user of the terminal device (101) and optionally access restriction information to the BIM data and/or security information, use restriction information for the route, external information and/or search option information. As a specific example, the computer (201) provide scoring during rainy weather such that the score of a route that does not become wet in rain is scored higher than a route that becomes wet in rain (for example a route that is outdoors and does not have a roof, or a route that is indoors but without a ceiling). Furthermore, as a specific example, if both hands of the user are full, the computer (201) provide scoring that matches the condition of the user by scoring the weight of pull open doors as 0, the weight of push open doors as 1, and the weight of automatic doors as 2.

In step 920, the computer (201) assigns an order based on condition order to the route candidates that were scored in step 919, and sorts the candidate routes based on this order. As a specific example, the conditions are such that a route that becomes wet with rain can be an easier route if both hands are full.

In step 921, the computer (201) searches the precaution information related to the candidate routes that satisfies at least 2 requirements specified in the user profile or the search option information from among the route candidates, based on the BIM data, user profile, security information, access restriction information, use restriction information, external information, and/or search option information. During this search, the precautionary information can be searched by considering at least 2 of the following conditions:

Floors that are slippery when wet+rainy weather;

Doors that are locked after 19:00+the current time is 18:45;

The elevator is congested between 17:30 and 18:00, +the current time is 17:30;

The weight restriction of the elevator is 300 kg+delivery cargo is 350 kg.

Furthermore, the computer (201) can create new precautionary information that is easy for the user to understand, for example, based on the precautionary information that has been received. For other examples of the precautionary information, refer to the precautionary information illustrated in FIG. 7 for example. The aforementioned precautionary information can be attached to the route guide information that is created in step 922.

In step 922, the computer (201) creates the route guide information based on the route candidates that were sorted in step 902.

In step 923, the computer (201) terminates the process for creating the route guide information.

FIG. 9C illustrates a flowchart for the process of determining the midway point and midway point order (step 917), from the flowcharts for the processes that create the route guide information illustrated in FIG. 9B.

In step 923, the computer (201) starts the process for determining the midway point and the midway point order.

In step 932, the computer (201) retrieves the BIM data associated with the midway point candidates, based on the BIM data, security information of the route, the user profile associated with the user of the terminal device (101) and optionally access restriction information to the BIM data and/or security information, use restriction information for the route, external information and/or search option information to memory (203) for example.

In step 933, the computer (201) uses the BIM data that was received to determine whether or not some of the midway point candidates have security. The computer (201) moves the process to step 934 based on the existence of midway point candidates with security. On the other hand, The computer (201) moves the process to step 935 if there are no midway point candidates with security.

In step 934, the computer (201) uses the security information for the route and surveys the travel authority for each of the midway point, based on some midway point candidates having security.

In step 935, the computer (201) determines one or a plurality of midway point and the midway point order, based on there being no midway point candidates with security in the determining step of step 933.

In step 936, the computer (201) determines there is travel authority for all of the midway point candidates, and determines whether or not it is possible to pass through the midway point candidates. The computer (201) moves the process to step 937, if the conditions are not met that there are no travel authority for all of the midway point candidates and that the midway points can be passed On the other hand, The computer (201) moves the process to step 935, if the condition are met that there are no travel authority for all of the midway point candidates and that the midway points can be passed.

In step 937, the computer (201) uses the received BIM data and determines whether or not the security information data "receptionist" can be received for the midway point candidates where there is not travel authority. The computer (201) moves the process to step 938, if the security information "receptionist" data can be received. On the other hand, the computer (201) moves the process to step 940, if the security information "receptionist" data cannot be received.

In step 935, the computer (201) determines one or a plurality of midway point and the midway point order, based on satisfying the condition that there are no midway point candidates with security and that travel is possible, in the determining step of step 933.

In step 938, the computer (201) adds the midway point order as the updated midway point order for passing through the midway point candidates where the received security information is "receptionist" in step 937, based on being able to receive data that the security information is "receptionist".

In step 939, the computer (201) determines whether or not survey is complete for whether the security information data "receptionist" can be received for all of the midway point candidates where there is not travel authority. The computer (201) moves the process to step 935, if the survey is completed. On the other hand, the computer (201) returns the process to step 937 and repeats steps 937, 938, and 939 until the survey is completed.

In step 940, the computer (201) excludes waypoints where the attribute information cannot be received if the security information "receptionist" data cannot be received. Furthermore, the computer (201) moves the process to step 939.

In step 935, the computer (201) determines one or a plurality of midway point and the midway point order, based on this survey being completed in the determining step of step 939.

In step 941, the computer (201) completes the process for determining the midway point and the midway point order.

Figure 10A:
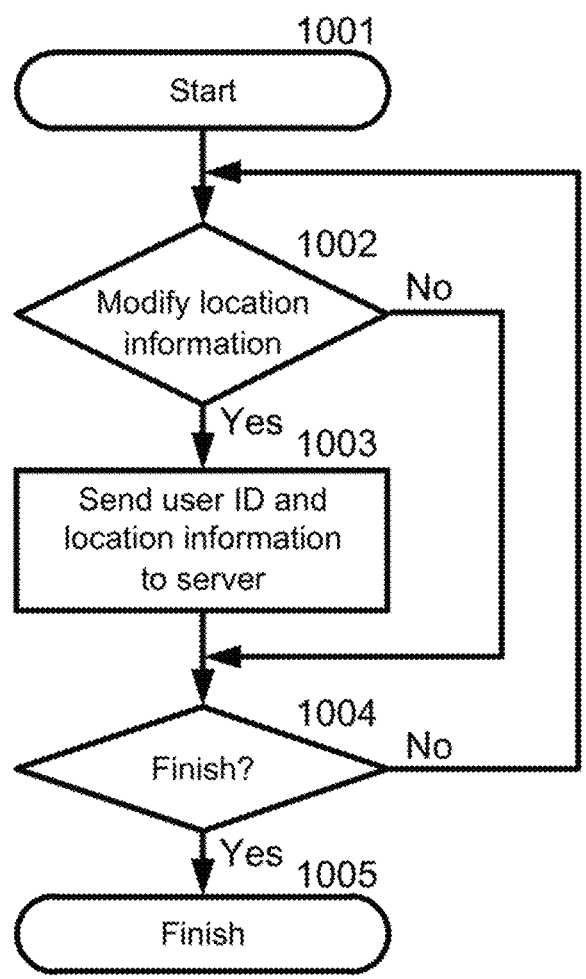
FIG. 10A illustrates a flowchart showing a process performed by the terminal device when the position information of the terminal device is updated while the user is using the route guide, in accordance with an aspect of the present invention.

FIG. 10A illustrates a flowchart showing a process performed by the terminal device (101) when the position information of the terminal device (101) is updated while the user is using the route guide, in accordance with an aspect of the present invention.

In step 1001, the terminal device (101) begins processes for determining whether or not the position information of the terminal device (101) has been updated.

In step 1002, the terminal device (101) determines whether or not the position information of the terminal device has been updated based whether the position information (position coordinates measured by GPS or position information measured by measuring means using the wireless LAN signal, for example) has been updated. The terminal device (101) moves the process to step 1003 if the position information has been updated. On the other hand, the terminal device (101) moves the process to the determining completion step 1004 if the position information of the terminal has not been updated even though a predetermined period of time has passed, for example.

In step 1003, the terminal device (101) transmits to the server (201) the user ID being used by the terminal device (101) and the current position information, if the position information has changed.

In step 1004, the terminal device (101) determines whether or not the process is complete for determining whether or not the position information of the terminal device (101) has been updated. On the other hand, the terminal device (101) moves the process to step 1002 if the processes are not completed.

In step 1005, the terminal device (101) terminates processes for determining whether or not the position information of the terminal device (101) has been updated.

Figure 10B:
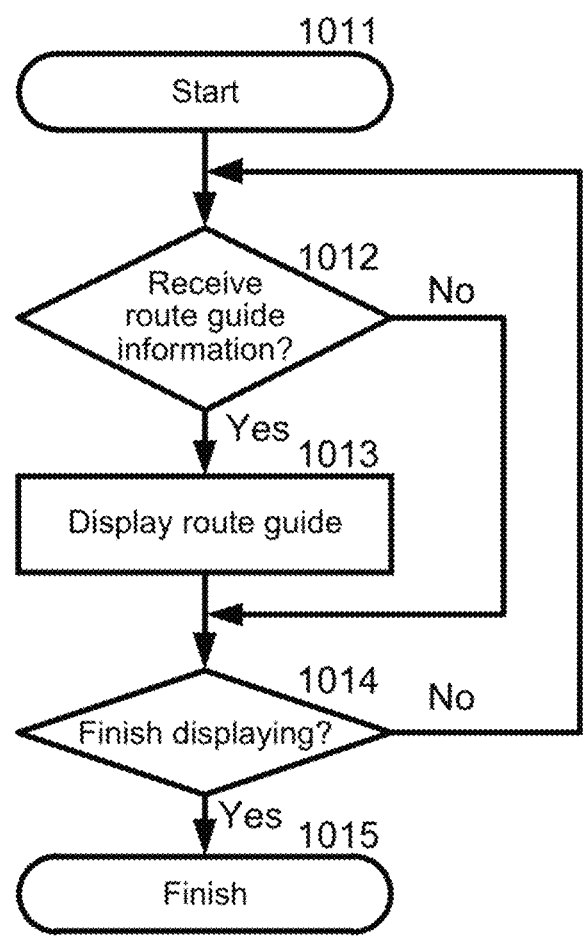
FIG. 10B illustrates a flowchart showing a process performed by the terminal device when the route guide information is updated while the user is using the route guide, in accordance with an aspect of the present invention.

FIG. 10B illustrates a flowchart showing a process performed by the terminal device (101) when the route guide information is updated while the user is using the route guide, in accordance with an aspect of the present invention.

In step 1011, the terminal device (101) begins a process for determining whether the route guide information has been updated.

In step 1012, the terminal device (101) determines whether or not the route guide information has been received from the server (201). The terminal device (101) moves the process to step 1 if the route guide information has been received. On the other hand, the terminal device (101) moves the process to the determining completion step 1014 if route guide information has not been received from the server (201) even though a predetermined period of time has passed, for example.

In step 1013, if route guide information has been received, the terminal device (101) replaces (or in other words updates) the route guide information being used with the route guide information that was received by the terminal device (101). The terminal device (101) uses the updated route guide information and continues to display the route guide.

In step 1014, the terminal device (101) determines whether or not display of the route guide is completed. The terminal device (101) moves the process to completion step 1015 if the process is completed. On the other hand, the terminal device (101) moves the process to step 1012 if the process is not completed.

In step 1015, the terminal device (101) terminates the process for determining whether or not the route guide information has been updated.

Figure 11:
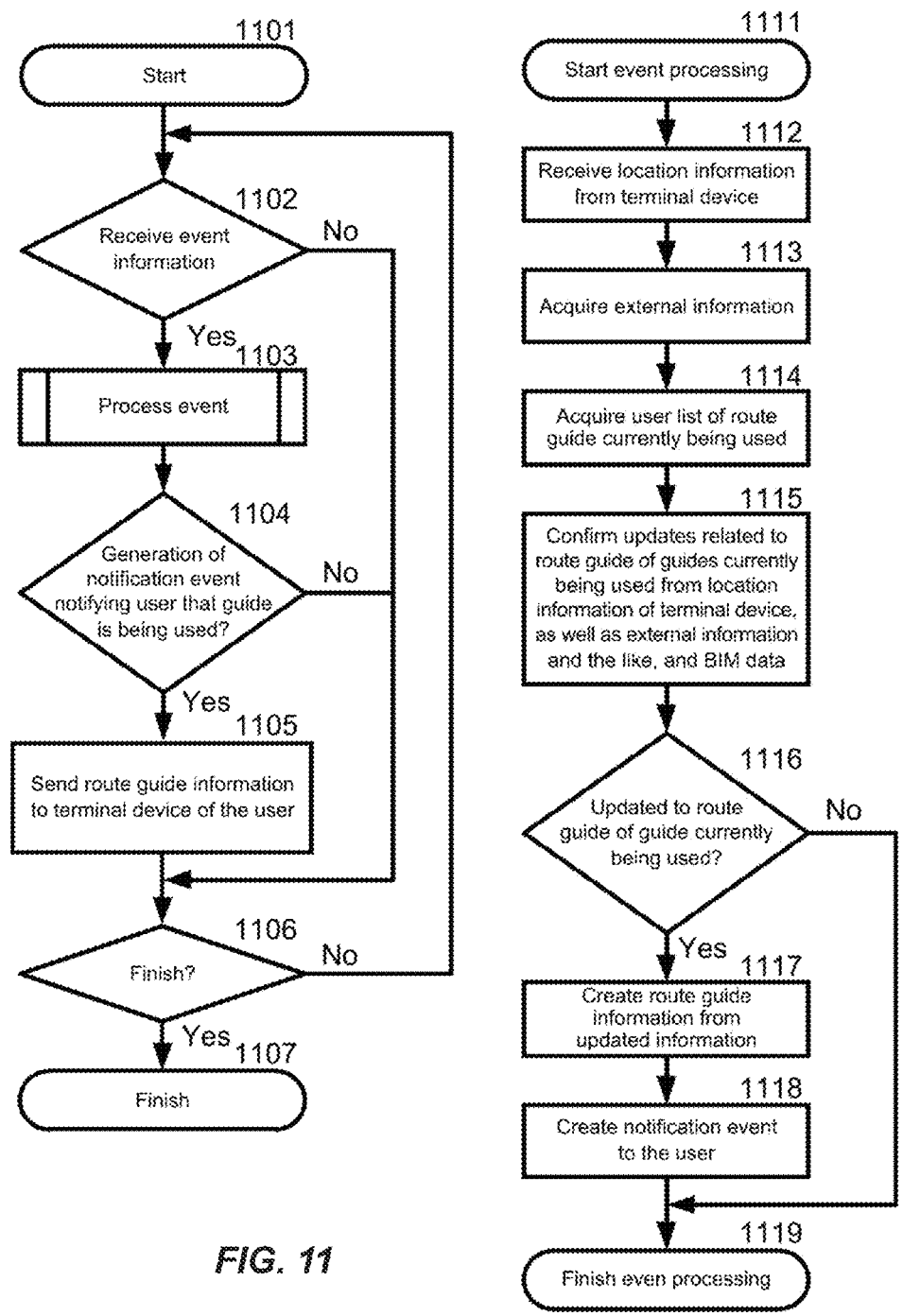
FIG. 11 illustrates a flowchart for a process where the computer updates the route guide when the user is using the route guide, in accordance with an aspect of the present invention.

FIG. 11 illustrates a flowchart for a process where the computer (201) updates the route guide when the user is using the route guide, in accordance with an aspect of the present invention.

In step 1101, the computer (201) starts a process of updating the route guide information.

In step 1102, the computer (201) determines whether or not event information has been received. The computer (201) can receive the event information from another computer other than the terminal device (101) and the computer (201), observation device (for example weather observation device, temperature monitoring device, congestion monitoring device, earthquake detecting device, fire detecting device) or from the computer (201). The event can be, for example, that rain has started falling, that a route without a roof is on the route, that the floor becomes slippery when wet, when the current position of the user being guided is away from the route, or when a fire or other accident has occurred. The computer (201) moves the process to step 1103, if event information has been received. On the other hand, the computer (201) moves the process to the completion determining step 1106, if event information is not received within a predetermined period of time.

In step 1103, the computer (201) processes the event based on the event information that was received. In other words, the route guide information is updated based on the content of the event. The details of the processes for processing the event are described while referring to the flowchart showing separate steps 1111 through 1119.

In step 1111, the computer (201) begins processing the event.

In step 1112, the computer (201) receives the current position information from the terminal device (101), either periodically, or when an event occurs at the terminal device (101). The computer (201) can determine whether or not the current position information is progressing, in accordance with the route guide information of the user and the condition of movement of the terminal device (101), based on periodic reception or on reception if an event occurs at the terminal device (101). The computer (201) can receive the position information of the terminal device (101) when or immediately after an event occurs, if the computer (201) receives the current position information based on occurrence of an event. This eliminates the problem that the position information of the terminal device (101) may be the information prior to occurrence of the event and can ensure that the positional information of the terminal device (101) is the positional information during or immediately after an event occurs.

In step 1113, the computer (201) receives the external information. The external information can include event information. The computer (201) can extract the event information from the external information that was received. In particular, the computer (201) can select and extract from the external information that was received event information that may require a change to the route guide, for example.

In step 1114, the computer (201) retrieves a list of users that are currently using the route guide. Furthermore, the computer (201) retrieves the user profiles for those users.

In step 1115, the computer (201) specifies the terminal devices (101) of the users that are currently using the route guide from the list of users that was retrieved in step 1114, and determines one or a plurality of midway points and midway point order to the destination, based on the positional information of the terminal devices (101, as well as the map data, BIM data, security information of the route, the user profile associated with the user of the terminal device (101) and optionally access restriction information to the BIM data and/or security information, use restriction information for the route, external information and/or search option information. The details of the process for determining one or a plurality of midway points and the midway point order are the same as for the aforementioned FIG. 9C. Furthermore, the computer (201) compares the midway points and the midway point order that was determined with the route guide that is currently distributed to the terminal devices (101), and updating of the route guide is confirmed.

In step 1116, the computer (201) determines whether or not there is an update to the route guide. The computer (201) moves the process to step 1117, if there is an update to the route guide. On the other hand, the computer (201) moves the process to termination step 1119, if there is not an update to the route guide.

In step 1117, the computer (201) creates route guide information from the updated information related to the route guide.

In step 1118, the computer (201) can create a notification event for notifying the terminal device (101) that is being used by a user in the user list received in step 1114 that the route guide information has been updated. Alternatively, the computer (201) can create a notification event for notifying that the route guide information has been updated to the terminal devices (101) that are being used by those users in the user list received in step 1114 that require notification of the updated information for the route guide. The fact that a notification event exists and the fact that there is updated information for the route guide of the user can be triggers that can be used in order to for the computer (201) to determine whether there is a need to provide notification to the user.

In step 1119, the computer (201) moves the process to step 1104 after processing of the event is completed.

In step 1104, the computer (201) determines whether or not there is a notification event to be notified to the users that are currently using the route guide. The computer (201) moves the process to step 1105, if there is a notification event. On the other hand, the computer (201) moves the process to step 1106, if there is not a notification event.

In step 1105, the computer (201) can transmit to the terminal device (101) of the user that a notification event has occurred in step 1118. The computer (201) transmits to the terminal device (101) the route guide information that was created in step 1117 based on the occurrence of a notification event. The computer (201) can also transmit to the terminal device (101) all of the updated route guide information, or can transmit to the terminal device (101) the difference between the updated route guide information and the route guide information that had already been transmitted to the terminal device (101).

In step 1106, the computer (201) determines whether or not to terminate the process of updating the route guide. The computer (201) moves the process to termination step 1007 if the process will be terminated. On the other hand, the computer (201) returns the process to step 1002 if the process will not be terminated.

In step 1107, the computer (201) terminates the process of updating the route guide information.

A specific example is described below while following the flowchart for processing an update to the route guide illustrated in FIG. 11.

For example, rain begins to fall while the user is moving along the route guide. The computer (201) receives the positional information each time the positional information is updated from the terminal device (101) of each user (step 1112).

The computer (201) receives from the server a transmission of the current weather based on external information that rain is falling (step 1113). The computer (201) receives the user list and specifies from the user list those users that are currently using the route guide (step 1114). Furthermore, the computer (201) receives information that one user is wearing slippery shoes while another user is wearing shoes that are not slippery, based on the user profiles of the specified users (step 1115). Furthermore, the computer (201) receives a route that is not slippery even when wet with water and routes that are slippery when wet with water on the route guide from the BIM data (step 1115). The computer (201) update the route guide information that is currently being used to use a route that is not slippery (step 1116). The computer (201) creates updated route guide information from the updated route guide information (step 1117). The computer (201) generates a notification event in order to notify that the route guide information has been updated to those users that are wearing slippery shoes (step 1118). On the other hand, the computer (201) does not generate a notification event in order to notify that the route guide information has been updated to those users that are not wearing slippery shoes. Alternatively, the computer (201) might not notify that the route guide information has been updated to those users that are not wearing slippery shoes.

Figure 12:
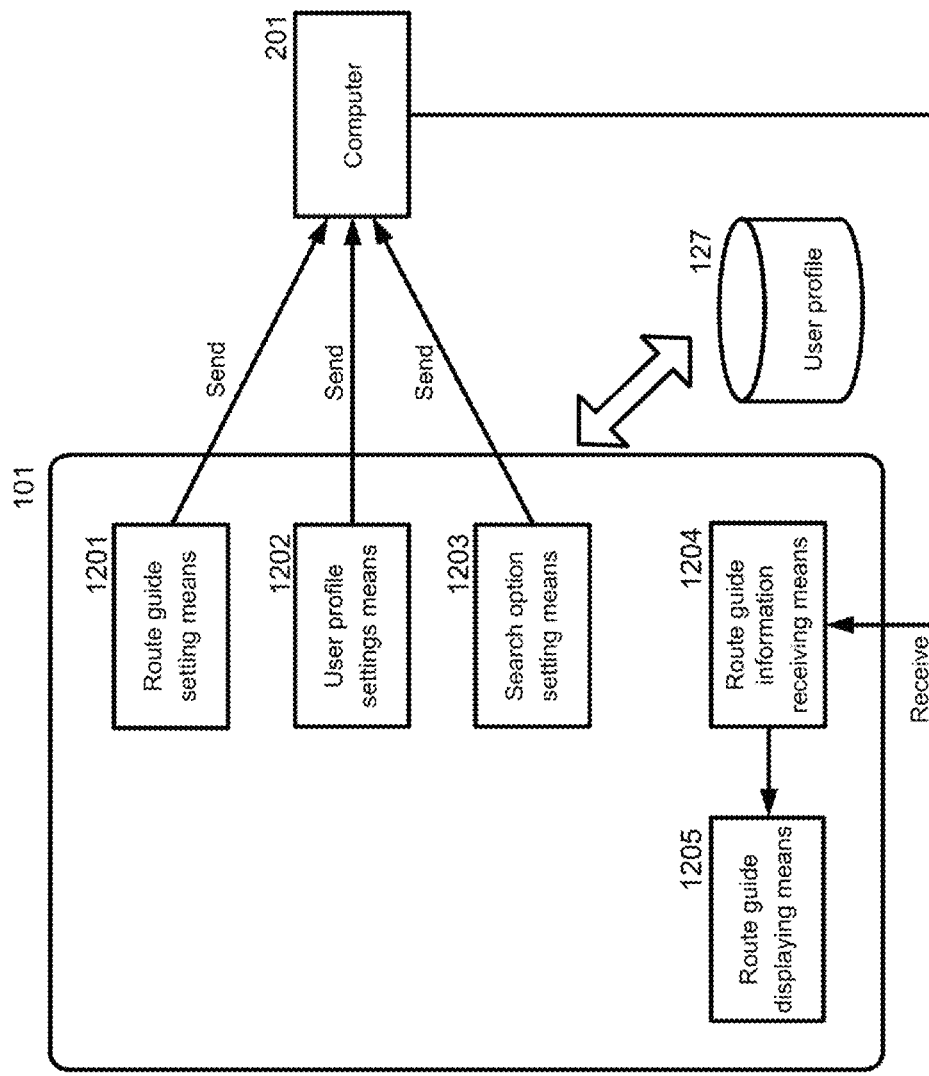
FIG. 12 is a diagram illustrating an example of a functional block diagram of the terminal device in accordance with an aspect of the present invention, that preferably provides a hardware configuration in accordance with FIG. 1.

FIG. 12 is a diagram illustrating an example of a functional block diagram of the terminal device (101) in accordance with an aspect of the present invention, that preferably provides a hardware configuration in accordance with FIG. 1.

The terminal device (101) includes in addition to the component elements illustrated in FIG. 1 (101 through 127), route guide setting means (1201), user profile setting means (1202), search option setting means (1203), route guide information receiving means (1204), and route guide displaying means (1205).

The route guide setting means (1201) enables the user to input various information such as the starting point, destination, midway point, scheduled starting time and/or scheduled arrival time. The user can input the information via a touch panel that is provided on the terminal device (101), or by using a keyboard or voice input. Furthermore, the user can specify the information either by selecting the information from a menu that displays on the screen or by inputting free text (natural language text). Furthermore, the route guide setting means (1201) can transmit the information to the computer (201). The route guide setting means (1201) executes step 808 shown in FIG. 8.

The user profile setting means (1202) enables the user to input the user profile. The user can input the user profile via a touch panel that is provided on the terminal device (101), or by using a keyboard or voice input. Furthermore, the user can specify the user profile either by selecting the user profile from a menu that displays on the screen or by inputting free text (natural language text). Furthermore, the user profile setting means (1202) can transmit the user profile to the computer (201). The user profile setting means (1202) executes step 808 shown in FIG. 8.

The search option setting means (1203) enables the user to input the search options. The user can input the search option information via a touch panel that is provided on the terminal device (101), or by using a keyboard or voice input. Furthermore, the user can specify the search option information either by selecting the search option information from a menu that displays on the screen or by inputting free text (natural language text). Furthermore, the search option setting means (1203) can transmit the search option information to the computer (201). The search option setting means (1203) executes step 808 shown in FIG. 8.

The route guide information receiving means (1204) receives the route guide information and the guide information from the server (201). The route guide information receiving means (1204) receives the route guide information transmitted in step 1105 shown in FIG. 11 and the route guide information transmitted in step 908 shown in FIG. 9A. The route guide information receiving means (1204) executes step 810 shown in FIG. 8.

The route guide displaying means (1205) displays the route guide to the user in accordance with the route guide information. The route guide can be displayed by displaying the route guide on the display device (106) of the terminal device (101), or by outputting an audio guide from an audio outputting means (for example speakers) of the terminal device (101), or by a combination thereof. The route guide displaying means (1205) can display the route guide using two-dimensional or three-dimensional model images or video display with a route display, or by displaying a walk-through video. Furthermore, the route guide displaying means (1205) can simultaneously output an audio guide and the two-dimensional or three-dimensional model images or video display or walk-through video. Furthermore, the route guide displaying means (1205) can optionally use augmented reality (AAR) technology to display (superimpose) information related to the method of using the equipment in the building, the method of operating, the direction of operation, and the method of unlocking or locking, as well as precautionary information, over a still image or video image in the route guide that is displayed, for example, on the two-dimensional or three-dimensional model images or video display or walk-through video. The route guide displaying means (1205) can display the route guide in real-time navigation format using the position information of the terminal device (101) in the building. The user can arbitrarily select how to display the route guide. The route guide displaying means (1205) executes step 811 shown in FIG. 8.

Figure 13:
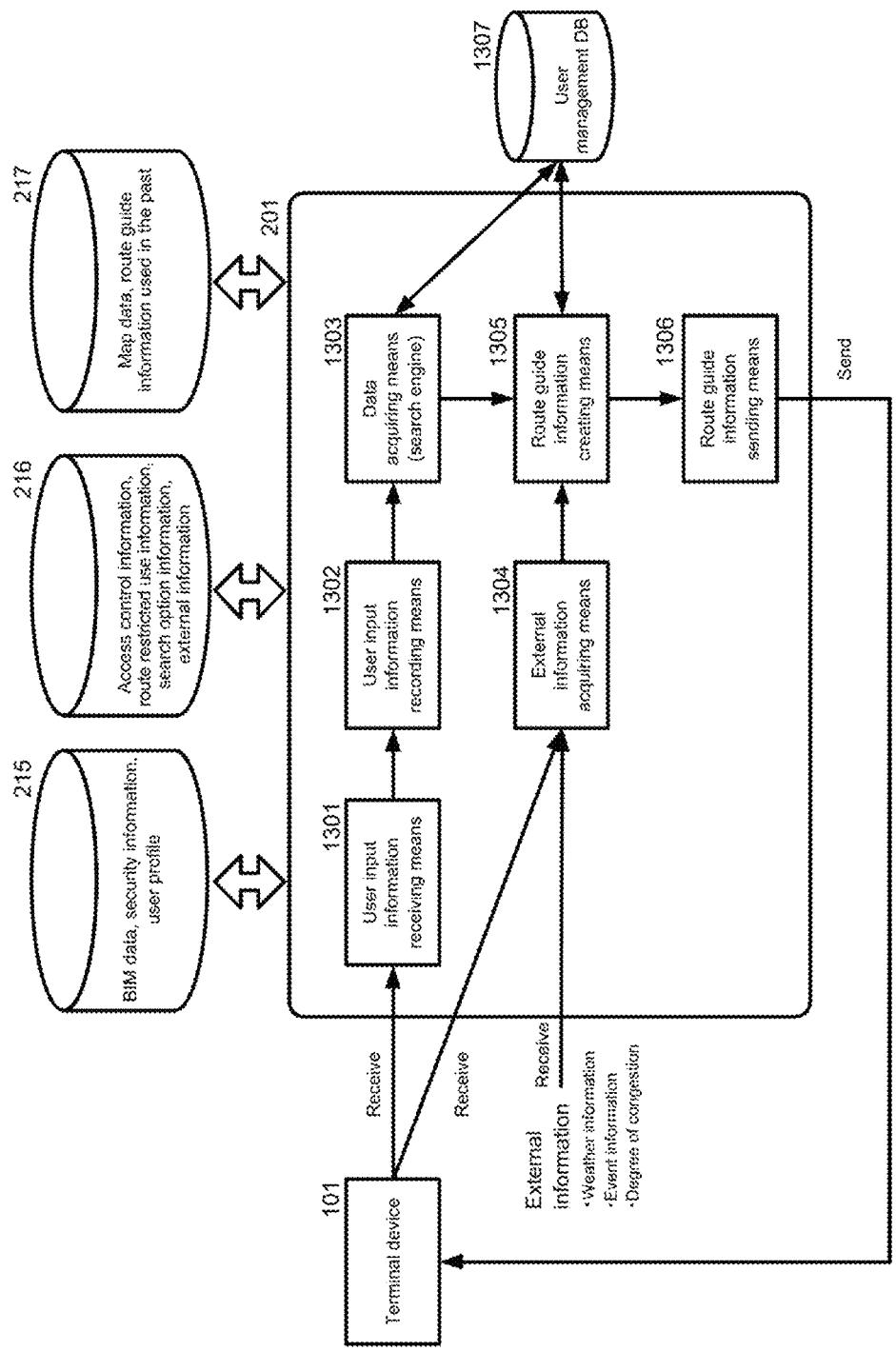
FIG. 13 is a diagram illustrating an example of a functional block diagram of the computer in accordance with an aspect of the present invention, that preferably provides a hardware configuration in accordance with FIG. 1.

FIG. 13 is a diagram illustrating an example of a functional block diagram of the computer (201) in accordance with an aspect of the present invention, that preferably provides a hardware configuration in accordance with FIG. 1.

The computer (201) includes in addition to the component elements illustrated in FIG. 2 (202 through 217), user input information receiving means (1301), user input information recording means (1302), data receiving means (1303), external information receiving means (1304), route guide information creating means (1305), route guide information transmitting means (1306), and user management database (hereinafter also referred to as "user management DB") (1307).

The user input information processing means (1301) receives information transmitted from the route guide setting means (1201) of the terminal device (101), the user profile transmitted from the user profile setting means (1202), and the search option information transmitted from the search option setting means (1203).

The user input information recording means (1302) stores in the recording means (208) the information received by the user input information processing means (1301), the user profile, and the search option information.

The recording means (208) can be the recording means illustrated in FIG. 13 (215, 216, 217).

The data detecting means (1303) can retrieve the necessary data for creating the route guide information from the recording means (215, 216, 217). Furthermore, the data receiving means (1303) can be packaged as a search engine.

The external information receiving means (1304) receives external information, for example, from a terminal device (101) or another computer (not shown in the drawings) other than the computer (201).

The route guide information creating means (1305) (corresponding to the "guide creating means" disclosed in the patent claims) creates route guide information based on the data received by the data receiving means (1303, and the external information received by the external information receiving means (1304). Furthermore, the route guide information creating means (1305) can create a route guide to the destination in accordance with the access restriction information to the BIM data and/or security information. Furthermore, the route guide information creating means (1305) can delete from the route guide a route to a security area and/or a floor map of the security area that are in the route guide, if the route guide to the destination is created in accordance with the access restriction information to the BIM data and/or the security information to the destination. Furthermore, the route guide information creating means (1305) can create a route guide to the destination based on the use restriction information on the route. Furthermore, the route guide information creating means (1305) can create a route guide to the destination in accordance with the search option information that was input by the user. Furthermore, the route guide information creating means (1305) can create a route guide to the destination, based on the starting point, destination, midway points, scheduled start time, scheduled arrival time, and/or external information. Furthermore, the route guide information creating means (1305) can create a route guide to the destination based on a route guide that was previously used by the user. Furthermore, the route guide information creating means (1305) can create a plurality of route guides to the destination. Furthermore, the route guide information creating means (1305) can estimate the expected time until arrival at the destination for each of the plurality of route guide. Furthermore, the route guide information creating means (1305) can attach precaution information or information related to the method of using facility equipment in the building, operating method, operating direction, and the method of unlocking or locking doors, to the route guide that was created. The route guide information creating means (1305) can execute step 907 illustrated in FIG. 9A, and the steps shown in FIG. 9B and FIG. 9C that illustrate in detail the content of processing step 907.

The route guide information transmitting means (1306) transmits to the terminal device (101) the route guide information that was created by the route guide information creating means (1305). The route guide information transmitting means (1306) executes step 908 shown in FIG. 9A.

The user management DB (1307) manages the user ID of the terminal devices (101) and the passwords if necessary. Furthermore, the user management DB manages the users that are currently using the route guide.

As illustrated in FIG. 1 and FIG. 2 as well as FIG. 12 and FIG. 13, an aspect of the present invention shows the terminal device (101) and the computer (201) to have a so-called client server format. In other words, the route guide system according to the present invention is shown to have a terminal device (101) and a computer (201). However, the route guide system according to the present invention may also be packaged simply as a terminal device (101) that incorporates all of the component elements of the computer (201). Therefore, with an aspect where the route guide system according to the present invention is packaged simply as the terminal device (101), the steps that are executed by the computer (201) as main operations described in the present specification can be interpreted as steps that are executed as main operations by the terminal device (101).

The invention claimed is:

1. A system for providing a route guide using building information modeling (BIM) data, the system comprising:
   one or more environmental sensors; and
   a computer coupled to the one or more environmental sensors; the computer operated to:
   receive, from a user terminal device, a request for a route guide to a destination in a building;
   receive BIM data for the building, including material properties of the elements that compose the building, wherein the material properties of the elements that compose the building are one or more material properties selected from a list consisting of: ease of slipping when wet, earthquake resistance, and flame retardancy base values;
   receive security information for a route, real-time information for building status, and a user profile;
   create a route guide to the destination in the building, based at least on the BIM data, security information, real-time information for building status, and the user profile;
   receive, from the one or more environmental sensors, information indicating that an environmental event has been detected;
   receive, from the user terminal device, its current position; and
   update the route guide from the user terminal device's current position based on the environmental event, and the material properties of the elements that compose the building that are related to the environmental event.

2. A system according to claim 1, wherein the one or more environmental sensors are one or more environmental sensors selected from the list consisting of: a weather observation device, a temperature monitoring device, can earthquake detecting device, and a fire detecting device.

3. A system according to claim 1, wherein the environmental event is an environmental event selected from the list consisting of: rain, fire, and an earthquake.

* * * * *